(12) United States Patent
Yasuhara et al.

(10) Patent No.: US 9,739,351 B2
(45) Date of Patent: Aug. 22, 2017

(54) CHAIN CONTINUOUSLY VARIABLE TRANSMISSION

(71) Applicant: JTEKT CORPORATION, Osaka-shi, Osaka (JP)

(72) Inventors: Shinji Yasuhara, Yamatokoriyama (JP); Taizou Wakayama, Kashiwara (JP); Teruhiko Nakazawa, Nagakute (JP)

(73) Assignee: JTEKT CORPORATION, Osaka-shi (JP)

(*) Notice: Subject to any disclaimer, the term of this patent is extended or adjusted under 35 U.S.C. 154(b) by 76 days.

(21) Appl. No.: 14/812,038

(22) Filed: Jul. 29, 2015

(65) Prior Publication Data
US 2016/0040761 A1    Feb. 11, 2016

(30) Foreign Application Priority Data

Aug. 8, 2014  (JP) .................................. 2014-162904

(51) Int. Cl.

| F16G 1/21 | (2006.01) |
|---|---|
| F16G 1/22 | (2006.01) |
| F16G 5/16 | (2006.01) |
| F16H 9/24 | (2006.01) |
| F16H 9/20 | (2006.01) |
| F16G 5/18 | (2006.01) |

(52) U.S. Cl.
CPC .................. F16H 9/24 (2013.01); F16G 5/18 (2013.01); F16H 9/20 (2013.01)

(58) Field of Classification Search
CPC ... F16G 5/18; F16G 13/06; F16H 9/24; B21L 15/005; B21L 15/00

USPC .................................................. 474/240, 245
See application file for complete search history.

(56) References Cited

U.S. PATENT DOCUMENTS

| 3,049,933 | A | * | 8/1962 | Besel ......................... F16G 5/18 474/201 |
|---|---|---|---|---|
| 3,353,421 | A | * | 11/1967 | Ketterle ..................... F16G 5/18 474/215 |
| 3,916,709 | A | * | 11/1975 | Steuer ........................ F16H 9/24 474/201 |
| 4,344,761 | A | * | 8/1982 | Steuer ........................ F16G 5/18 474/167 |
| 4,505,693 | A | * | 3/1985 | Moss ......................... F16G 5/18 474/240 |

(Continued)

FOREIGN PATENT DOCUMENTS

EP     1 862 700 A2    12/2007

*Primary Examiner* — Henry Liu
(74) *Attorney, Agent, or Firm* — Oliff PLC

(57) ABSTRACT

When a chain is wound around a pulley, a pin-pulley contact point as a contact point of a pin of the chain with the pulley slides and moves on a conical surface of the pulley. A contact point slip distance, namely the distance by which the pin-pulley contact point moves on the conical surface at this time, is associated with an offset. The offset is the distance between a pin-pin contact point, which is a contact point between the pins at the time the chain is in a linear state, and the pin-pulley contact point in a y-axis direction. Offsets that minimize the contact point slip distance at the maximum running radius and the minimum running radius of the chain are obtained, and the offset is set between these values. The pin-pulley contact point is set close to the pin-pin contact point of the chain in the linear state.

6 Claims, 20 Drawing Sheets

(56) References Cited

U.S. PATENT DOCUMENTS

| | | | | |
|---|---|---|---|---|
| 4,581,001 A * | 4/1986 | Rattunde | | F16H 9/24 474/214 |
| 4,813,918 A * | 3/1989 | Rattunde | | F16H 9/24 474/201 |
| 4,911,682 A * | 3/1990 | Ivey | | F16G 5/18 474/215 |
| 4,927,404 A * | 5/1990 | Rattunde | | F16H 9/24 474/242 |
| 5,026,331 A * | 6/1991 | Sugimoto | | F16H 9/24 474/214 |
| 5,026,332 A * | 6/1991 | Mott | | F16G 5/18 474/242 |
| 5,242,334 A * | 9/1993 | Sugimoto | | F16G 5/18 474/215 |
| 5,318,485 A * | 6/1994 | Bateman | | F16H 9/24 474/245 |
| 5,427,583 A * | 6/1995 | Wolf | | F16H 9/24 474/206 |
| 5,792,013 A * | 8/1998 | Heinrich | | F16H 9/24 474/242 |
| 6,135,908 A * | 10/2000 | Greiter | | F16G 5/18 474/202 |
| 6,142,903 A * | 11/2000 | Heinrich | | F16G 5/18 474/215 |
| 6,293,887 B1 * | 9/2001 | Linnenbrugger | | F16H 9/125 474/18 |
| 6,299,559 B1 * | 10/2001 | Friedmann | | F16G 5/18 474/213 |
| 6,346,058 B1 * | 2/2002 | Linnenbrugger | | F16G 5/18 474/212 |
| 6,406,396 B1 * | 6/2002 | Turner | | F16G 5/18 474/206 |
| 6,527,657 B2 * | 3/2003 | Sakakibara | | F16G 5/18 474/242 |
| 6,695,731 B2 * | 2/2004 | Linnenbrugger | | F16G 13/06 474/202 |
| 7,179,184 B2 * | 2/2007 | Linnenbrugger | | F16G 13/06 229/207 |
| 7,204,775 B2 * | 4/2007 | Teubert | | F16G 5/18 474/206 |
| 7,320,656 B2 * | 1/2008 | Linnenbrugger | | B21L 15/00 474/219 |
| 7,357,742 B2 * | 4/2008 | Wagner | | F16G 5/18 474/202 |
| 7,470,204 B2 * | 12/2008 | Triller | | F16G 5/18 474/201 |
| 7,686,722 B2 * | 3/2010 | Baumann | | F16G 5/18 474/215 |
| 7,846,050 B2 * | 12/2010 | Miura | | F16G 5/18 474/245 |
| 7,892,127 B2 * | 2/2011 | Tada | | F16G 13/06 474/206 |
| 7,993,229 B2 * | 8/2011 | Kamamoto | | F16G 5/18 474/215 |
| 8,038,561 B2 * | 10/2011 | Yasuhara | | F16G 5/18 474/215 |
| 8,052,561 B2 * | 11/2011 | Oberle | | B21L 15/00 474/215 |
| 8,398,513 B2 * | 3/2013 | Simonov | | F16G 5/18 474/217 |
| 8,500,582 B2 * | 8/2013 | Triller | | F16G 5/18 474/157 |
| 8,636,611 B2 * | 1/2014 | Kamamoto | | F16G 5/18 474/244 |
| 8,678,966 B2 * | 3/2014 | Kamamoto | | F16G 5/18 474/213 |
| 8,708,851 B2 * | 4/2014 | Tada | | F16G 5/18 474/215 |
| 8,894,524 B2 * | 11/2014 | Matsumoto | | F16G 5/18 474/206 |
| 8,986,145 B2 * | 3/2015 | Kamamoto | | F16G 5/18 474/245 |
| 2001/0019978 A1 * | 9/2001 | Sakakibara | | F16G 5/18 474/245 |
| 2001/0019979 A1 * | 9/2001 | Wakabayashi | | F16G 5/18 474/245 |
| 2001/0023575 A1 * | 9/2001 | Linnenbrugger | | B21L 9/065 59/31 |
| 2003/0036450 A1 * | 2/2003 | Linnenbrugger | | B21L 15/00 474/201 |
| 2004/0248682 A1 * | 12/2004 | Wagner | | F16G 5/18 474/215 |
| 2005/0187057 A1 * | 8/2005 | Lou | | F16G 5/18 474/245 |
| 2005/0202915 A1 * | 9/2005 | Pichura | | F16G 13/02 474/206 |
| 2005/0282674 A1 * | 12/2005 | Teubert | | F16G 5/18 474/229 |
| 2007/0042849 A1 * | 2/2007 | Tada | | F16G 5/18 474/206 |
| 2007/0072722 A1 * | 3/2007 | Kamamoto | | F16G 5/18 474/245 |
| 2007/0129195 A1 * | 6/2007 | Kuster | | F16G 5/18 474/245 |
| 2007/0149331 A1 * | 6/2007 | Yasuhara | | F16G 5/18 474/215 |
| 2007/0149332 A1 * | 6/2007 | Kamamoto | | F16G 5/18 474/229 |
| 2007/0191166 A1 * | 8/2007 | Yasuhara | | F16G 5/18 474/245 |
| 2007/0232430 A1 * | 10/2007 | Yasuhara | | F16G 5/18 474/245 |
| 2007/0232431 A1 * | 10/2007 | Kamamoto | | B21L 15/005 474/245 |
| 2007/0238566 A1 * | 10/2007 | Miura | | F16G 5/18 474/245 |
| 2007/0275805 A1 * | 11/2007 | Huttinger | | B21L 9/065 474/215 |
| 2008/0070744 A1 * | 3/2008 | Tada | | F16G 5/18 476/40 |
| 2008/0161148 A1 * | 7/2008 | Tada | | F16G 13/06 474/245 |
| 2009/0105026 A1 * | 4/2009 | Kamamoto | | F16G 5/18 474/245 |
| 2009/0233744 A1 * | 9/2009 | Kitamura | | F16G 5/18 474/148 |
| 2009/0233745 A1 * | 9/2009 | Tada | | F16H 9/16 474/148 |
| 2010/0069189 A1 * | 3/2010 | Tada | | F16G 5/18 474/245 |
| 2010/0203988 A1 * | 8/2010 | Kamamoto | | F16H 9/24 474/8 |
| 2011/0039643 A1 * | 2/2011 | Kamamoto | | F16G 5/18 474/8 |
| 2013/0109521 A1 * | 5/2013 | Nakazawa | | F16G 13/06 474/228 |

* cited by examiner

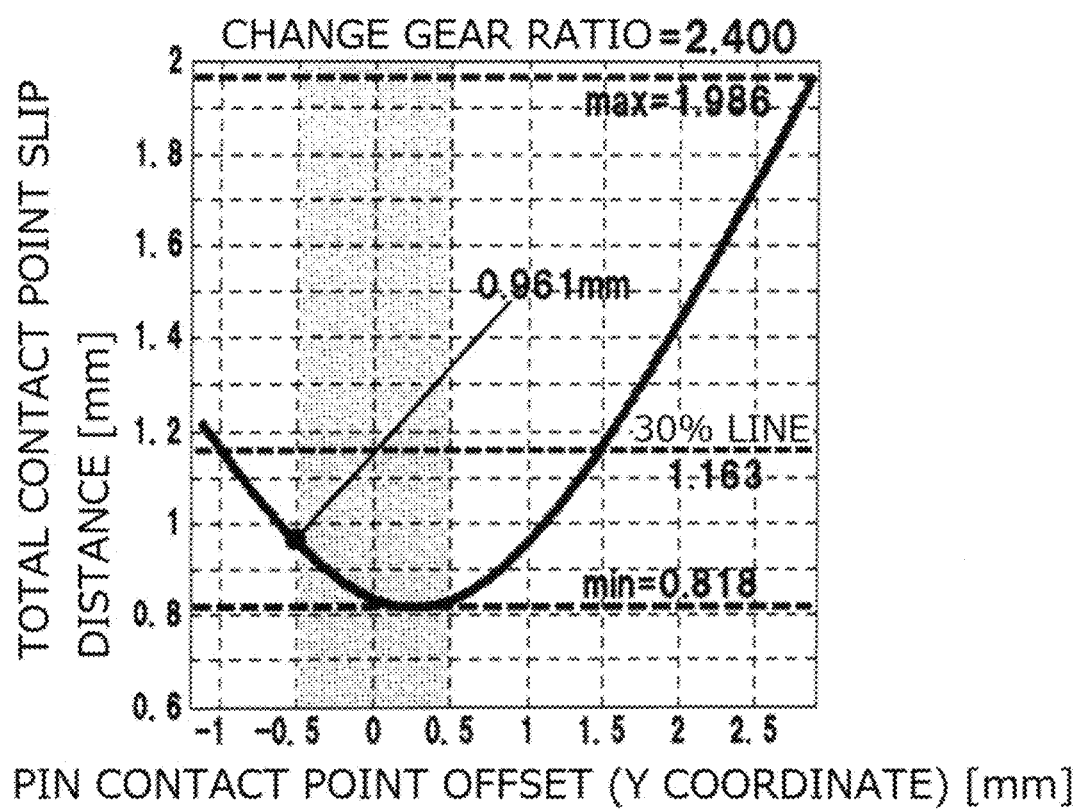

CHAIN CONTINUOUSLY VARIABLE TRANSMISSION

INCORPORATION BY REFERENCE

The disclosure of Japanese Patent Application No. 2014-162904 filed on Aug. 8, 2014 including the specification, drawings and abstract is incorporated herein by reference in its entirety.

BACKGROUND OF THE INVENTION

1. Field of the Invention

The present invention relates to chain continuously variable transmissions.

2. Description of the Related Art

Continuously variable transmissions (CVTs) are known in which two pulleys each have opposing conical surfaces and each are configured so that the distance between the conical surfaces can be changed, and a flexible endless member is wound around the two pulleys. Rotation of one of the pulleys is transmitted to the other pulley via the flexible endless member. At this time, the running radius of the flexible endless member around each pulley is changed by changing the distance between the opposing conical surfaces, whereby the change gear ratio can be changed.

CVTs using a chain as the flexible endless member are known in the art. In this chain, plate-like links each having an opening are arranged in the circumferential direction of the chain. The chain is formed by coupling chain elements to each other. Each chain element includes a link unit and two pins. The link unit is formed by a plurality of the links arranged in the lateral direction of the chain. The pins extend through both ends of each of the openings of the links. The chain elements are coupled to each other by inserting the pin of each chain element through the openings of the links of another adjoining chain element.

Both ends of both or one of the two pins of each link unit contact the opposing conical surfaces of the pulley. European Patent Application Publication No. 1862700 (EP 1862700) discloses a chain in which a contact point of a pin with a conical surface of a pulley is located outside the centerline of the pin in the thickness direction of the chain (see FIG. 3B). EP 1862700 describes that positioning the contact point in this manner can reduce noise (see FIG. 5).

Loss that is caused by slipping at the contact point of the pin with the pulley has not been considered in the chain CVTs.

SUMMARY OF THE INVENTION

It is an object of the present invention to reduce loss that is caused by slipping at a contact point of a pin with a pulley.

According to one aspect of the present invention, a continuously variable transmission includes: two pulleys each having opposing conical surfaces and configured so that a distance between the conical surfaces can be changed; and a chain that is wound around the two pulleys and is held between the conical surfaces. The continuously variable transmission is characterized in that the chain includes plate-like links each having an opening and arranged in a circumferential direction of the chain and is formed by coupling chain elements to each other in the circumferential direction of the chain, and each of the chain elements includes a link unit that is formed by a plurality of the links arranged in a lateral direction of the chain, and two pins that extend through both ends of each of the openings of the links and that contact the conical surfaces at their both ends. The chain elements are coupled to each other by inserting the pin of each chain element through the openings of the links of another chain element adjoining in the circumferential direction of the chain. A tensile force that is applied to the chain is transmitted between the pins of the adjoining chain elements.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 36 is a graph showing the relation between the offset and the total contact point slip distance for the change gear ratio of 2.400 in the chain of Specifications 4.

DETAILED DESCRIPTION OF EMBODIMENTS

Figure 1:
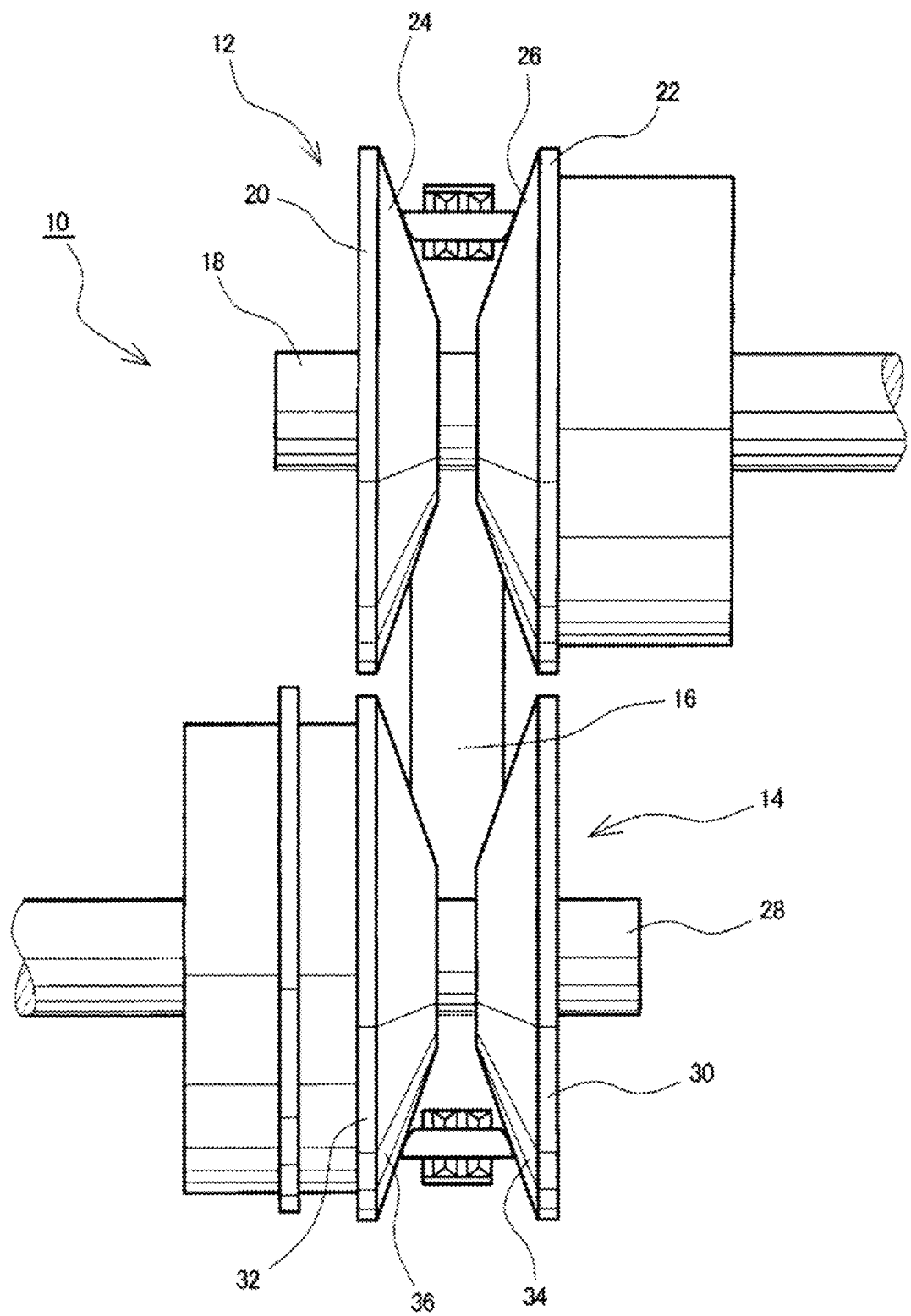
FIG. 1 is a diagram showing a main part of a chain CVT.

An embodiment of the present invention will be described below with reference to the accompanying drawings. FIG. 1 shows a main part of a chain CVT 10. The chain CVT 10 includes two pulleys 12, 14 and a chain 16 wound around the pulleys 12, 14. One of the two pulleys is herein referred to as the "input pulley 12," and the other pulley as the "output pulley 14." The input pulley 12 has a fixed sheave 20 and a movable sheave 22. The fixed sheave 20 is fixed to an input shaft 18. The movable sheave 22 can slide and move along an input axis on the input shaft 18. The opposing surfaces of the fixed and movable sheaves 20, 22 are shaped like the side of a cone. These surfaces are herein referred to as the "conical surfaces 24, 26." These conical surfaces 24, 26 form a V-shaped groove, and the chain 16 is placed in this groove, namely is interposed between the conical surfaces 24, 26, such that the conical surfaces 24, 26 face the sides of the chain 16. Like the input pulley 12, the output pulley 14 also has a fixed sheave 30 and a movable sheave 32. The fixed sheave 30 is fixed to an output shaft 28. The movable sheave 32 can slide and move along an output axis on the output shaft 28. The opposing surfaces of the fixed and movable sheaves 30, 32 are shaped like the side of a cone. These surfaces are herein referred to as the "conical surfaces 34, 36." These conical surfaces 34, 36 form a V-shaped groove, and the chain 16 is placed in this groove, namely is interposed between the conical surfaces 34, 36, such that the conical surfaces 34, 36 face the sides of the chain 16.

The fixed sheave and the movable sheave are disposed in reverse order between the input pulley 12 and the output pulley 14. That is, the movable sheave 22 of the input pulley 12 is located on the right side in FIG. 1, whereas the movable sheave 32 of the output pulley 14 is located on the left side in FIG. 1. As the movable sheave 22, 32 slides, the distance between the opposing conical surfaces 24, 26 or between the opposing conical surfaces 34, 36 changes, and the width of the V-shaped groove formed by these opposing conical surfaces 24, 26 or 34, 36 changes accordingly. As the width of the V-shaped groove changes, the running radius of the chain 16 around the pulley 12, 14 changes accordingly. That is, as the movable sheave 22, 32 moves away from the fixed sheave 20, 30, the width of the V-shaped groove increases accordingly. The chain 16 thus moves to a deeper position in the V-shaped groove, whereby the running radius decreases accordingly. On the other hand, as the movable sheave 22, 32 moves toward the fixed sheave 20, 30, the width of the V-shaped groove decreases accordingly. The chain 16 thus moves to a shallower position in the V-shaped groove, whereby the running radius increases accordingly. The running radius is changed in the opposite directions between the input pulley 12 and the output pulley 14 so that the chain 16 does not become slack. Since the movable sheave 22, 32 slides, the width of the V-shaped groove changes continuously, and the running radius also changes continuously. The change gear ratio in transmission from the input shaft 18 to the output shaft 28 can thus be changed continuously.

Figure 2:
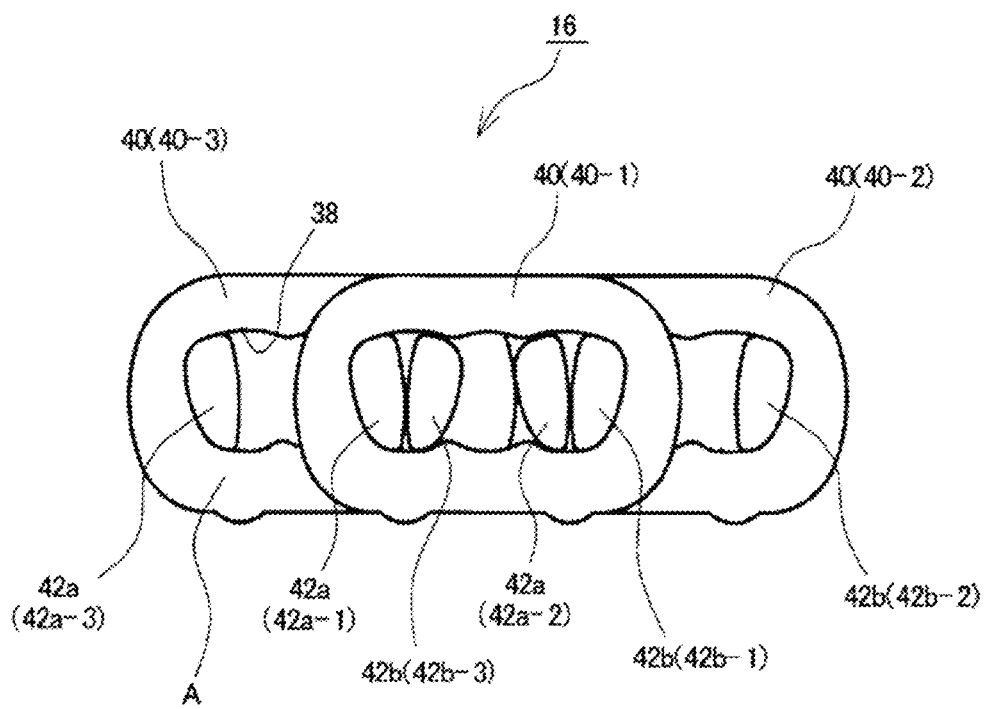
FIG. 2 is a side view showing the structure of a chain.
Figure 3:
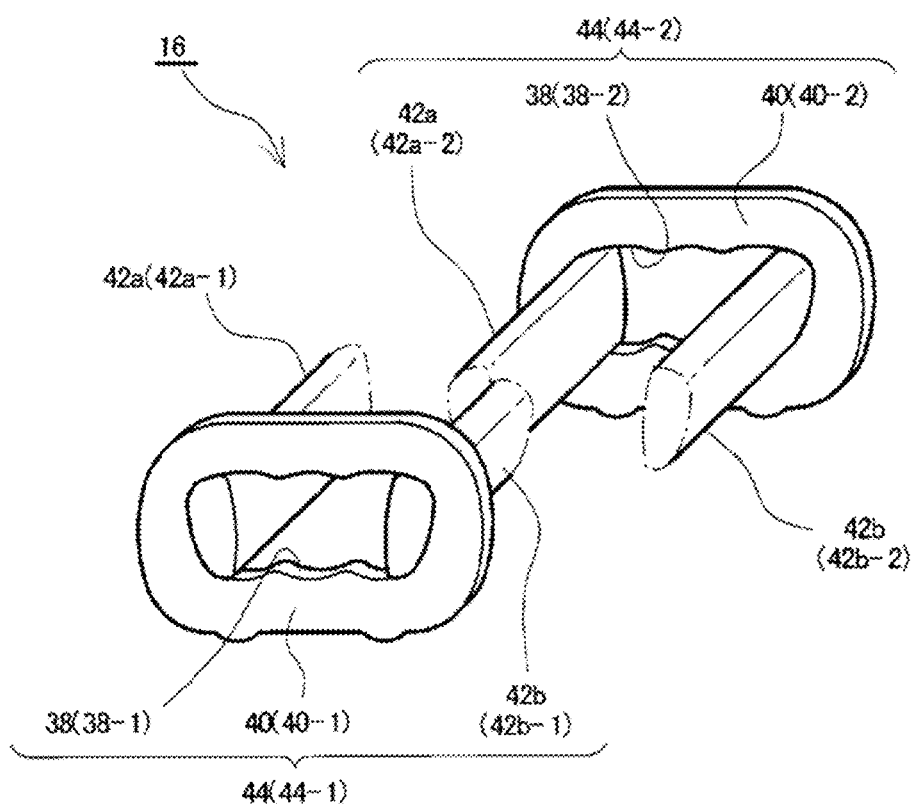
FIG. 3 is a perspective view illustrating the structure of the chain.
Figure 4:
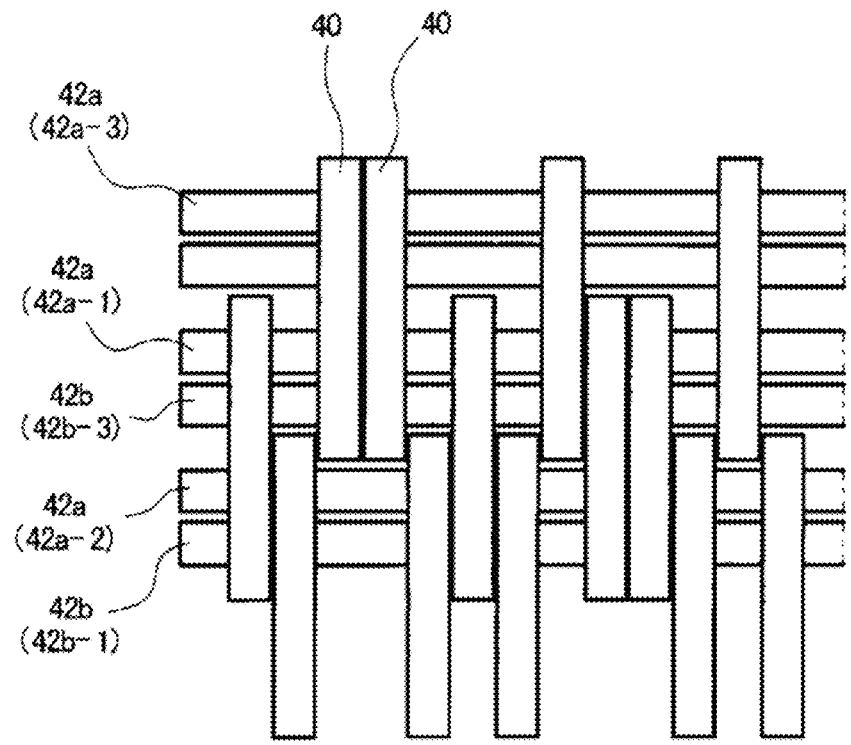
FIG. 4 is a plan view showing the structure of the chain.

FIGS. 2 to 4 are views specifically showing the structure of the chain 16. In the following description, the "circumferential direction" refers to the direction along the direction in which the chain 16 extends, the "lateral direction" refers to the direction perpendicular to the circumferential direction and parallel to the input shaft 18 and the output shaft 28, and the "thickness direction" refers to the direction perpendicular to the circumferential direction and the lateral direction. FIG. 2 is a view showing a part of the chain 16 as viewed in the lateral direction, FIG. 3 is a partial exploded view of the chain 16, and FIG. 4 is a view showing the outer periphery of a part of the chain 16 as viewed in the thickness direction.

The horizontal direction in FIG. 2 corresponds to the circumferential direction, and the vertical direction in FIG. 2 corresponds to the thickness direction. The chain 16 is formed by combining plate-like links 40 each having an opening 38 and bar-like pins 42a, 42b. The links 40 have the same shape and the same thickness, and the bar-like pins 42a, 42b have the same shape. The links 40 are arranged in a predetermined pattern in the lateral direction (see FIG. 4). Two pins 42a, 42b extend through both ends of the opening 38 of each link 40. Both ends of the two pins 42a, 42b or both ends of one of the two pins 42a, 42b contact the conical surfaces 24, 26, 34, 36 of the input and output pulleys 12, 14. Each set of the two pins 42a, 42b and those links 40 having the two pins 42a, 42b extending therethrough is herein referred to as the "chain element 44." FIG. 3 shows two chain elements 44-1, 44-2. The characters "-1," "-2," and "-3" are added for distinguishing each chain element and its links and pins from the other chain elements. The chain element 44-1 is formed by a plurality of links 40-1 and two pins 42a-1, 42b-1 extending through the links 40-1. The two pins 42a-1, 42b-1 are press-fitted or fixedly positioned in both ends of an opening 38-1 of the link 40-1, whereby the two pins 42a-1, 42b-1 are coupled to the link 40-1. Similarly, the chain element 44-2 is formed by a plurality of links 40-2 and two pins 42a-2, 42b-2 extending through the links 40-2. Those links 40 forming a single chain element 44 are herein collectively referred to as the "link unit." The characters "-1," "-2," and "-3" are added when identifying the chain element including the link unit.

The adjoining chain elements 44-1, 44-2 are coupled together by inserting the pins 42a, 42b through the openings 38 of each other's links 40. As shown in FIG. 3, the pin 42b-1 of the left chain element 44-1 is inserted into the opening 38-2 so as to be located on the right side of the pin 42a-2 of the right chain element 44-2. The pin 42a-2 of the right chain element 44-2 is inserted into the opening 38-1 so as to be located on the left side of the pin 42b-1 of the left chain element 44-1. These two pins 42b-1, 42a-2 engage with each other, so that a tensile force of the chain 16 is transmitted therebetween. When the chain 16 is bent, adjoining pins, e.g., the pins 42b-1, 42a-2, move so as to roll on each other's contact surfaces. The chain 16 is thus allowed to be bent.

FIG. 4 shows the links 40 and the pins 42a, 42b of three chain elements 44. Those chain elements 44 adjoining these three chain elements 44 are not shown in FIG. 4. A plurality of links 40 are arranged in the lateral direction (the horizontal direction in FIG. 4) and are shifted as appropriate in the circumferential direction. The chain elements 44 are thus connected in the circumferential direction to form a single chain. The arrangement of the links 40 shown in the figure is by way of example only, and the links 40 may be arranged in other patterns.

Figure 5:
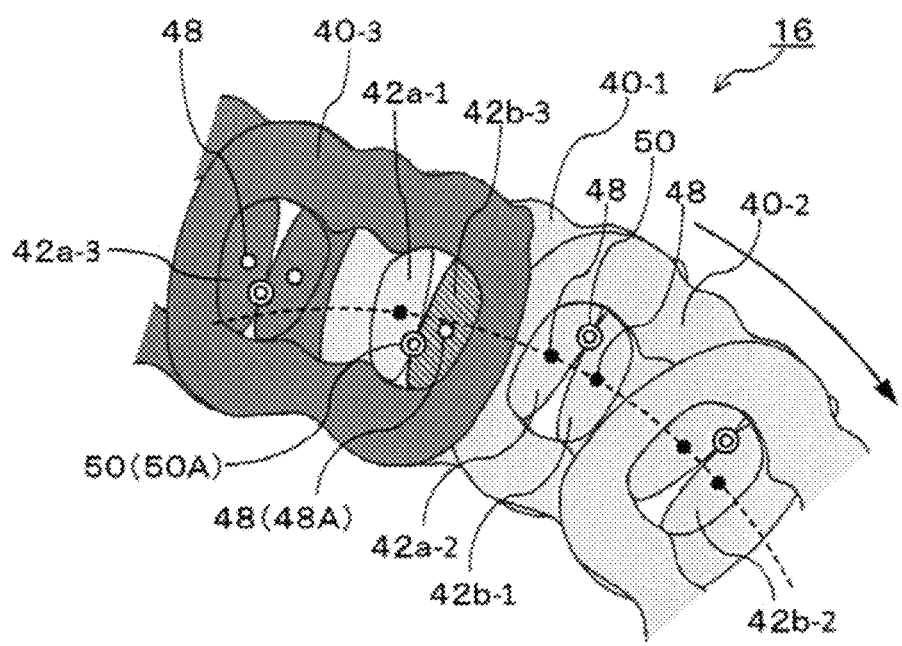
FIG. 5 is a diagram illustrating behavior of pins at the time the chain is stretched and bent.
Figure 6:
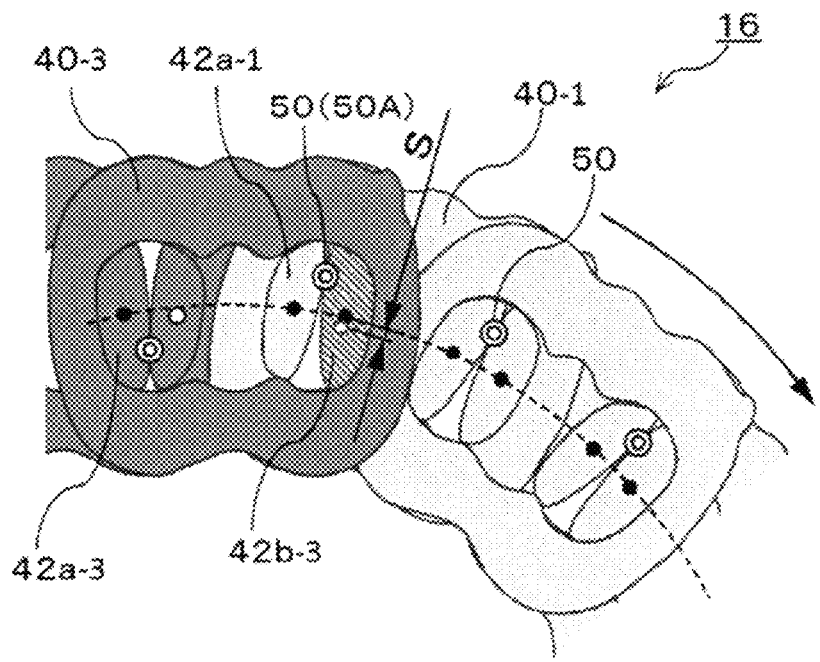
FIG. 6 is a diagram illustrating the behavior of the pins at the time the chain is stretched and bent.

FIGS. 5 and 6 show behavior of the chain 16, especially the pins 42a, 42b, at the time the chain 16 engages with one of the pulleys 12, 14. For simplicity, the behavior of the chain 16 will be described below with respect to the input pulley 12. FIGS. 5 and 6 show the state of the chain 16 as viewed from a fixed point on the input pulley 12. FIG. 5 shows the state where the link 40-3 has started to engage with the input pulley 12, and FIG. 6 shows the state where the link 40-3 has completely engaged with the input pulley 12. In FIGS. 5 and 6, black circles "●" and white circles "○" represent contact points 48 of the pins 42a, 42b with the conical surface of the input pulley 12 at the time the pins 42a, 42b are interposed between the conical surfaces of the input pulley 12 (hereinafter these contact points are referred to as the "pin-pulley contact points 48"). Each black circle shows the pin-pulley contact point 48 at the time the chain element 44 including a corresponding pin has completely engaged with the input pulley 12. In FIG. 5, the chain element 44-1 has completely engaged with the input pulley 12. The pin-pulley contact points 48 of the two pins 42a-1, 42b-1 of this chain element 44-1 are therefore shown by the black circles. Each white circle shows the pin-pulley contact point 48 at the time the chain element 44 including a corresponding pin has not completely engaged with the input pulley 12. The pins do not contact the pulley before entering the V-shaped groove of the pulley. However, for convenience of description, the pin-pulley contact points as used herein include those points that are going to contact the pulley.

In FIGS. 5 and 6, double circles represent contact points 50 between the pins (hereinafter these contact points are referred to as the "pin-pin contact points 50"). The pin-pin contact points 50 move as the chain 16 is wound around the input pulley 12. The pin-pin contact point 50A in FIGS. 5 and 6 shows the pin-pin contact point at the time a corresponding chain element 44 of the chain 16 has started to be wound around the input pulley 12 (FIG. 5) and at the time the corresponding chain element 44 of the chain 16 has been completely wound around the input pulley 12 (FIG. 6). As the pin 42b-3 of the chain element 44-3 moves so as to roll on the side surface of the pin 42a-1, the pin-pin contact point 50A moves outward in the thickness direction of the chain 16. The pin-pin contact point 50A moves until the chain element 44-3 completely engages with the input pulley 12.

Contact between the pins and contact between the pin and the pulley are actually surface contact rather than point contact due to deformation of the members. However, deformation of the members such as the pins and the pulley is herein not considered, and it is herein assumed that the pins and the pulley are completely rigid and point-contact each other.

Each of the pin-pulley contact points 48 is a fixed point on the end face of the pin 42. However, the pin-pulley contact points 48 move on the conical surface of the input pulley 12 as the chain 16 is wound around the input pulley 12. In FIG. 5, the chain element 44-3 has started to be wound around the input pulley 12. At this time, the pin-pulley contact point 48A of the front one 42b-3 of the two pins of the chain element 44-3 is located inside an arc (shown by a dashed line in the figure) passing through the pin-pulley contact points 48 shown by the black circles on the conical surface of the input pulley 12. The pin-pulley contact point 48A moves outward in the radial direction of the input pulley 12 as the chain element 44-3 is wound around the input pulley 12. The pin-pulley contact point 48A reaches the arc shown by the dashed line when the rear pin 42a-3 is held between the conical surfaces of the input pulley 12, namely when the chain element 44-3 has been completely wound around the input pulley 12. The pin-pulley contact point 48A thus moves on the conical surface of the input pulley 12 as the chain element 44-3 is wound around the input pulley 12. Friction that is generated by slipping between the pin-pulley contact point 48A and the conical surface of the input pulley 12 contributes to loss of the chain CVT. Similarly, the pin-pulley contact point 48 slips on the conical surface of the output pulley 14 when the chain 16 is wound around the output pulley 14.

The pin-pulley contact points 48 also slip when the chain 16 leaves the pulley 12, 14. At this time, the pin-pulley contact point 48 of the rear pin 42 of the chain element 44 that is leaving the pulley 12, 14 moves on the conical surface of the pulley 12, 14.

As described above, when the chain 16 enters and leaves the pulley 12, 14, that is, when the chain 16 is stretched and bent to be changed between a bent state and a linear state, the pin-pulley contact points 48 slip and move on the conical surface of the pulley 12, 14. The distance by which the pin-pulley contact points 48 move in the thickness direction of the chain 16 at this time is hereinafter referred to as the "contact point slip distance S." The larger the contact point slip distance S is, the greater the loss is. The contact point slip distance S is larger in the case where the chain 16 is bent to a larger extent, that is, in the case where the running radius of the chain 16 is smaller. In the chain CVT 10, the running radius of the chain 16 is different between the input pulley 12 and the output pulley 14 except in the case where the change gear ratio is 1. Accordingly, the contact point slip distance S is also different between the input pulley 12 and the output pulley 14 except in the case where the change gear ratio is 1. Friction loss between the chain 16 and the pulley 12, 14 therefore needs to be evaluated for the sum of the contact point slip distances S between the two pins 42a, 42b and the pulley 12, 14 at the time a single chain element 44 moves around the pulleys 12, 14. The sum of the contact point slip distances S is herein referred to as the "total contact point slip distance T."

Figure 7:
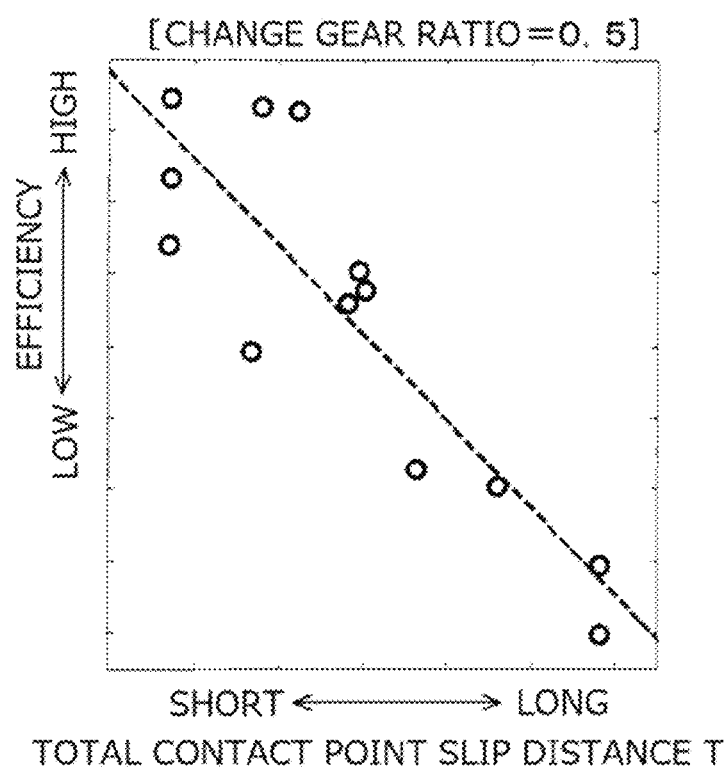
FIG. 7 is a graph showing the relation between the contact point slip distance and the efficiency.
Figure 8:
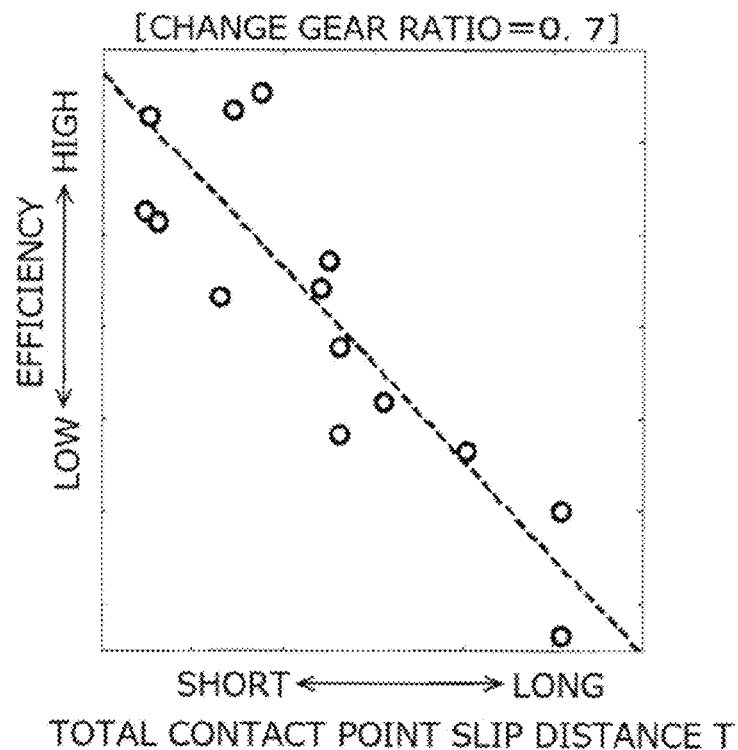
FIG. 8 is a graph showing the relation between the contact point slip distance and the efficiency.
Figure 9:
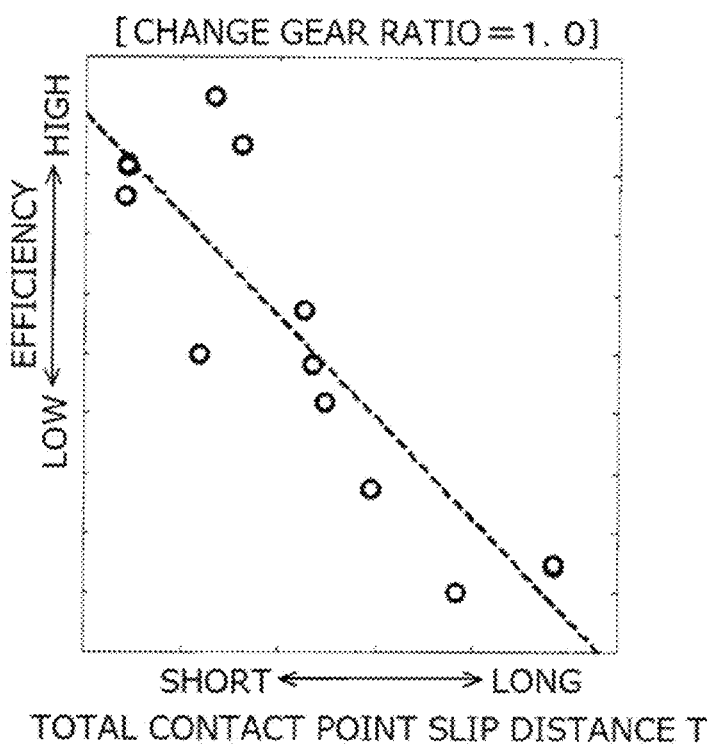
FIG. 9 is a graph showing the relation between the contact point slip distance and the efficiency.

FIGS. 7 to 9 are graphs with the abscissa representing the total contact point slip distance T and the ordinate representing efficiency. Plotted points in each figure show the result for chains having different specifications. Specifically, the plotted points in each figure show the result for chains that are different in the shape of the contact surface between the pins (the shape of an action curve described below) and in the positions of the pin-pin contact points and the positions of the pin-pulley contact points in the chain in the linear state. FIGS. 5 and 6 show an example in which two pins of each chain element 44 contact the pulley. However, FIGS. 7 to 9 also show an example in which only one of the two pins of each chain element 44 contacts the pulley. FIGS. 7 to 9 show the cases where the change gear ratio is 0.5, 0.7, and 1.0, respectively. The result of FIGS. 7 to 9 shows that the shorter the total contact point slip distance T is, the higher the efficiency is.

Figure 10:
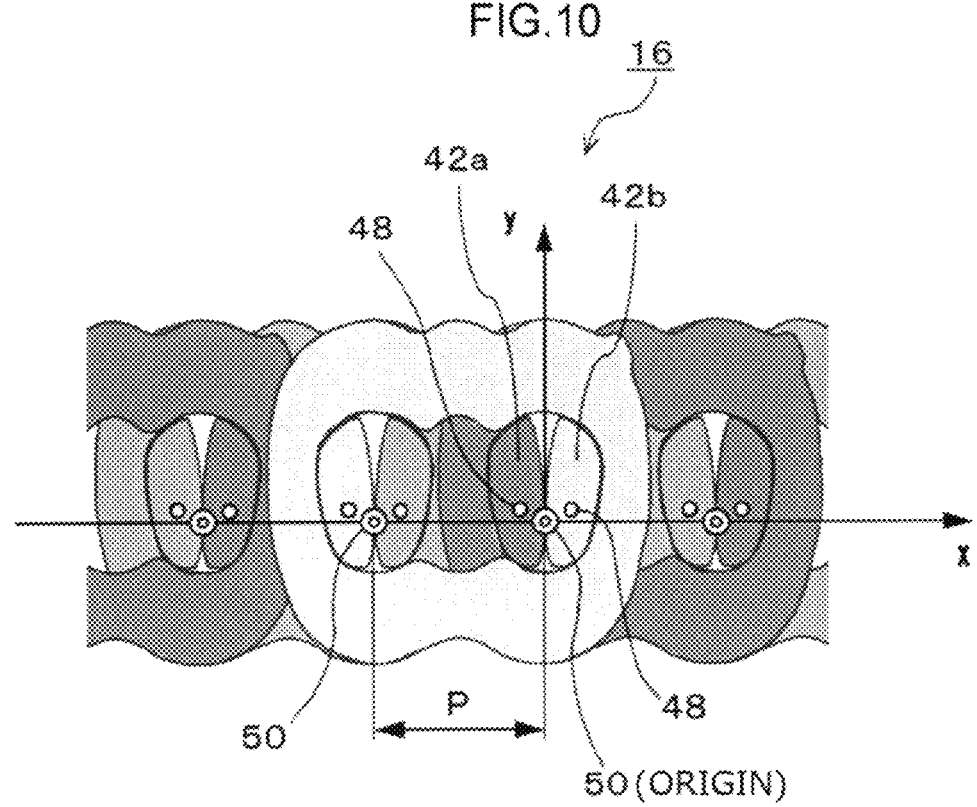
FIG. 10 is a diagram showing a coordinate system and a parameter for chains of Specifications 1 and 2.
Figure 11:
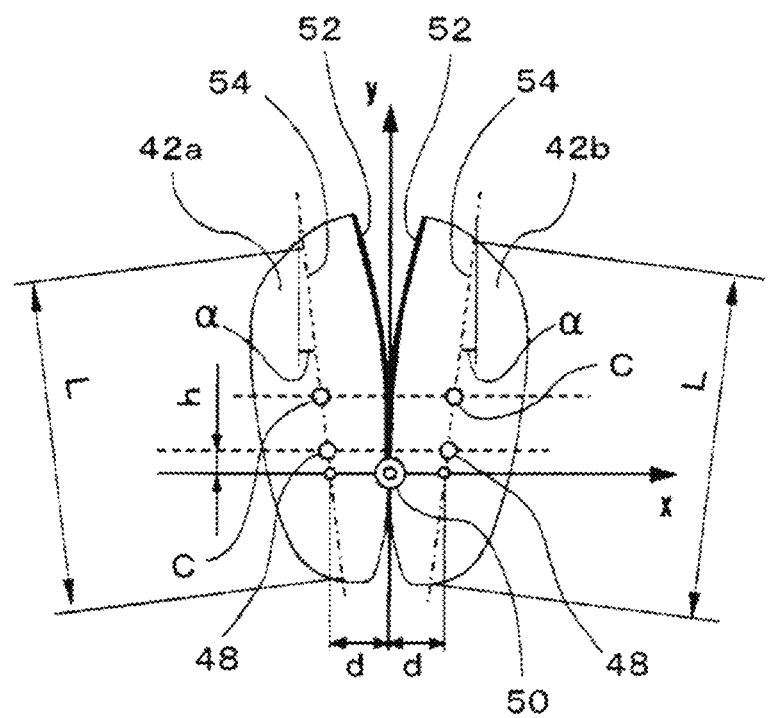
FIG. 11 is a diagram showing the coordinate system and parameters for the chains of Specifications 1 and 2.

The shape of the pins which reduces the contact point slip distance S will be described below. For illustration, a coordinate system and parameters are defined as shown in FIGS. 10 and 11. FIG. 10 shows the chain 16 in the linear state. The pin-pin contact point 50 of the chain 16 in the linear state is the origin of the coordinate axes. The x-axis is the circumferential direction of the chain 16, and the positive direction of the x-axis is the traveling direction of the chain 16. The y-axis is the thickness direction of the chain 16, and the positive direction of the y-axis is the radially outward direction of the chain 16. The z-axis is the lateral direction of the chain 16. That is, the z-axis is an axis perpendicular to the x-axis and the y-axis. The positive direction of the z-axis is determined so as to create a right-handed coordinate system. The distance between adjoining pin-pin contact points 50 is herein referred to as the "contact point pitch P." Since the pin-pin contact points 50 move as the chain 16 is bent, the contact point pitch P varies depending on the bent state of the chain 16.

FIG. 11 is a diagram showing only two of the pins 42a, 42b which contact each other. The pins have the same sectional shape along the z-direction except their both ends. The end faces of each pin are tilted according to the conical surfaces of the pulleys 12, 14. The sectional shape of each pin therefore varies in the regions including the end faces thereof. For simplicity, the shape of the pins 42a, 42b will be described by using a projection on a plane perpendicular to the z-axis. The pin-pin contact point 50 actually appears as a line extending parallel to the z-axis. Those parts of the opposing side surfaces of the two pins 42a, 42b which are located on the positive side of the y-axis are herein referred to as the "action curve 52." When distinguishing between the action curves 52 of the two pins 42a, 42b, the action curve of the pin 42a is referred to as the "action curve 52a," and the action curve of the pin 42b is referred to as the "action curve 52b." In the following description, when it is necessary to distinguish the elements relating to the pin 42a from those relating to the pin 42b, the letter "a" is added to the reference characters denoting the elements relating to the pin 42a, and the letter "b" is added to the reference characters denoting the elements relating to the pin 42b. When the chain 16 is stretched and bent, the pin-pin contact point 50 moves on the action curves 52.

The end faces of the pins 42a, 42b are curved outward in a convex shape. The sections of the pins 42a, 42b perpendicular to the y-axis are curved in a convex shape toward the conical surfaces of the pulley 12, 14. For each of the pins 42a, 42b, the line connecting the outermost points of the end face of the pin 42a, 42b in each section of the pin 42a, 42b perpendicular to the y-axis is herein referred to as the "end face ridge." The end face ridge projected on an x-y plane is referred to as the "projected ridge 54," The length of the projected ridge 54 is referred to as the "projected ridge length L." When distinguishing between the projected ridges of the two pins 42a, 42b, the projected ridge of the pin 42a is referred to as the "projected ridge 54a," and the length thereof is referred to as the "projected ridge length La." The projected ridge of the pin 42b is referred to as the "projected ridge 54b," and the length thereof is referred to as the "projected ridge length Lb." The inclination of the projected ridge 54 (54a, 54b) with respect to the y-axis is denoted by "a (aa, ab)." The distance between the intersection of the projected ridge 54 (54a, 54b) with the x-axis and the origin is denoted by "d (da, db)." The midpoint of the projected ridge 54 (54a, 54b) is referred to as the "pin center C (Ca, Cb)." The distance of the pin-pulley contact point 48 from the x-axis, namely the y-coordinate of the pin-pulley contact point 48, is referred to as the "offset h." In other words, the offset h is a directed distance of the pin-pulley contact point 48 from the pin-pin contact point 50 as a reference point in the thickness direction of the chain 16. The positive direction of the y-axis is the positive direction of the offset h or the directed distance.

Table 1 shows specific values of the parameters described above in the embodiment of the chain 16, specifically the pins 42. These values are hereinafter referred to as "Specifications 1." In this example, the two pins 42a, 42b have the same shape, and as shown in FIGS. 10 and 11, the sectional shapes of the two pins 42a, 42b are mirror images of each other with respect to the y-axis. Accordingly, behavior of the pin 42b at the time the chain element 44 enters the pulley 12, 14 is symmetrical to that of the pin 42a at the time the chain element 44 leaves the pulley 12, 14, and the contact point slip distance S is the same between the pins 42a, 42b. Only one of the pins 42a, 42b will therefore be described below. The action curves 52 of the pins 42a, 42b are arcs tangential to each other at the origin and having a radius of 9.5 mm. The chain 16 of the present embodiment is an endless chain having 90 chain elements connected together.

TABLE 1

| [Specifications 1] | |
|---|---|
| Contact with pulley | Two pins contact pulley |
| Pin shape | Two pins have the same shape |
| Action curve | Arc with radius of 9.5 mm |
| Contact point pitch P (in linear state) | 7.14 mm |
| Inclination α of projected ridge | 8.5° |
| Projected ridge length L | 5.9 mm |
| Distance d of projected ridge from origin | 1.466 mm |
| Total number of chain elements | 90 |
| y-coordinate of pin center C | 0.874 mm |
| Shaft distance | 156 mm |

Figure 12:
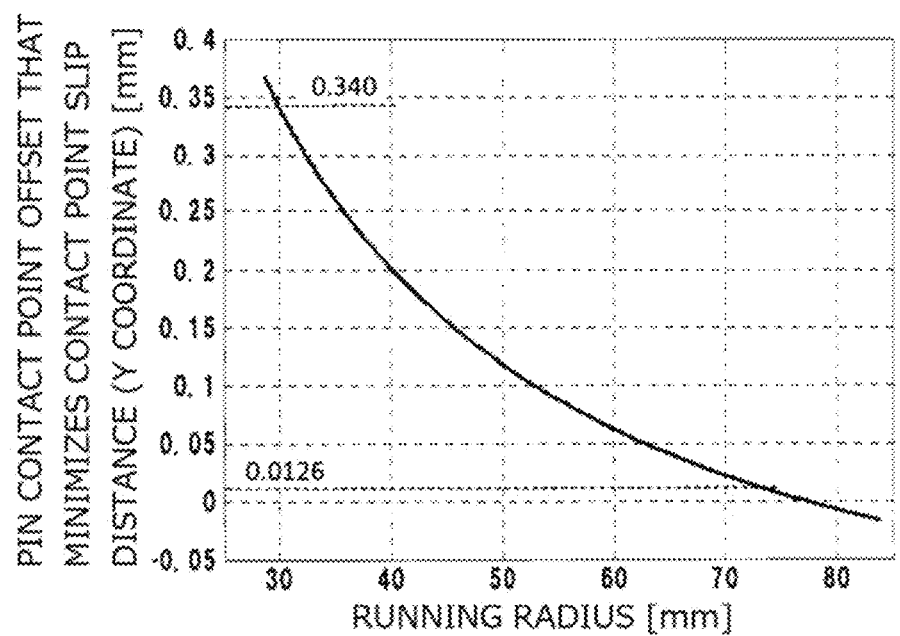
FIG. 12 is a graph showing the relation between the running radius of the chain and the offset that minimizes the contact point slip distance in the chain of Specifications 1.

FIG. 12 is a graph showing the offset h that minimizes the contact point slip distance S for each running radius of the chain 16 of Specifications 1 described in Table 1. Since the pin 42 contacts the conical surfaces of the pulley 12, 14, the position of the pin-pulley contact point 48 on the pin 42a, 42b does not change even if the running radius changes. As can be seen from FIG. 12, the offset h that minimizes the contact point slip distance S monotonically decreases with an increase in running radius. Accordingly, if the offset h is set in the range corresponding to the shift range that can be attained by the chain CVT, namely in the range of offset corresponding to the running radius range, the contact point slip distance S is minimized when the chain CVT is operated with the corresponding running radius in the running radius range. In particular, it is preferable to set the offset h to a value corresponding to the running radius of the change gear ratio that is frequently used. Reducing the contact point slip distance S is also advantageous in terms of friction.

For example, the offset h can be set as follows in the case of using the running radius of 30 to 73 mm. The offset h that minimizes the contact point slip distance S is 0.340 mm when the running radius is 30 mm, and is 0.0126 mm when the running radius is 73 mm. Setting the offset h between 0.0126 mm and 0.340 mm, both inclusive, can minimize the contact point slip distance S at a running radius of the corresponding change gear ratio in the shift range and can thus reduce slip loss.

$$0.0126 \text{ mm} \leq h \leq 0.340 \text{ mm} \tag{1}$$

Figure 13:
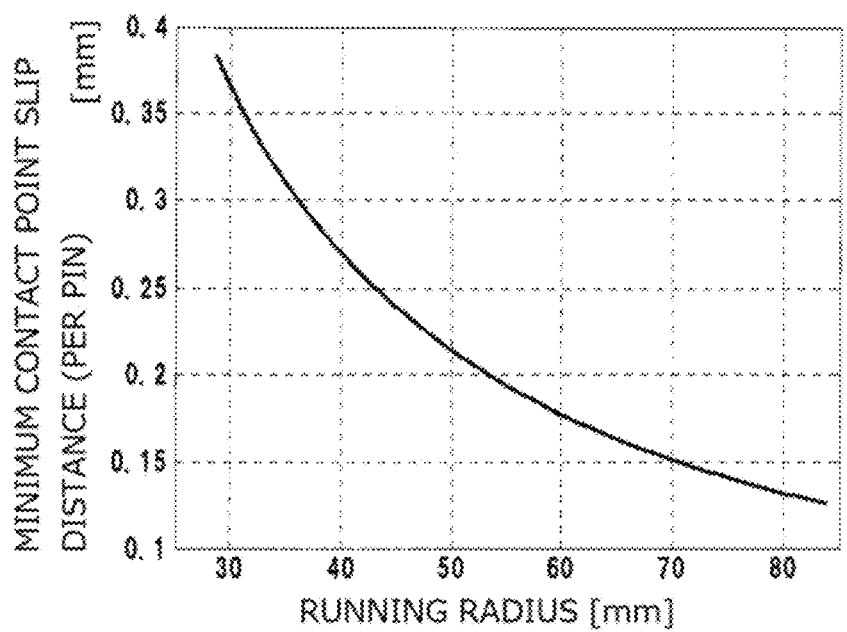
FIG. 13 is a graph showing the relation between the running radius of the chain and the minimum contact point slip distance in the chain of Specifications 1.

FIG. 13 is a graph showing the relation between the running radius and the minimum contact point slip distance S. The offset h that minimizes the contact point slip distance S is obtained for each running radius, and the minimum contact point slip distance S for each running radius is shown in the graph. The graph shows that the contact point slip distance S increases as the running radius decreases, namely as the chain 16 is bent to a larger extent.

Figure 14:
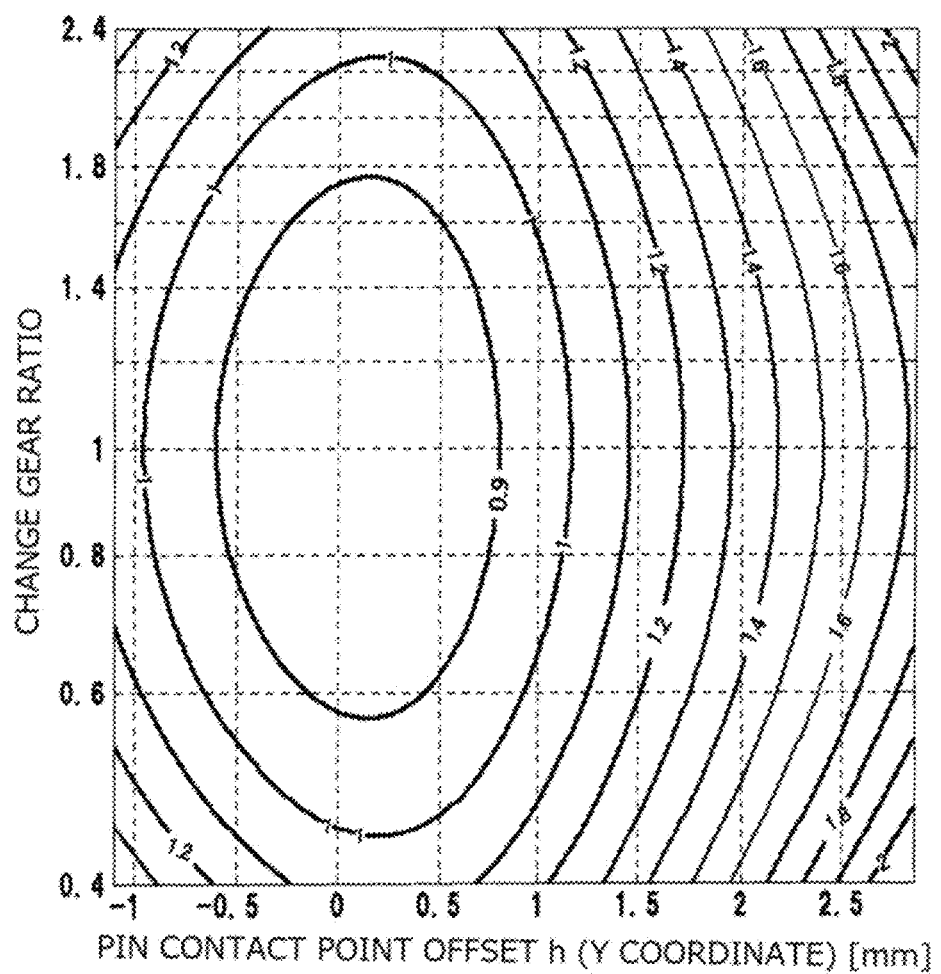
FIG. 14 is a graph showing the relation of the offset and the change gear ratio to the total contact point slip distance in the chain of Specifications 1.

FIG. 14 is a graph showing the relation of the change gear ratio and the offset h to the total contact point slip distance T. The abscissa represents the offset h, and the ordinate represents the change gear ratio. Lines that look like contour lines are lines connecting the same total contact point slip distances T. The closer the offset h is to zero, that is, the closer the pin-pulley contact point 48 is to the origin, the smaller the total contact point slip distance T is. Accordingly, setting the offset h in a certain range close to the origin can reduce the total contact point slip distance T in the shift range. For the change gear ratio of 1.0 (running radius: 51.5 mm), the total contact point slip distance T is minimized when the offset h is 0.102 mm.

Figure 15:
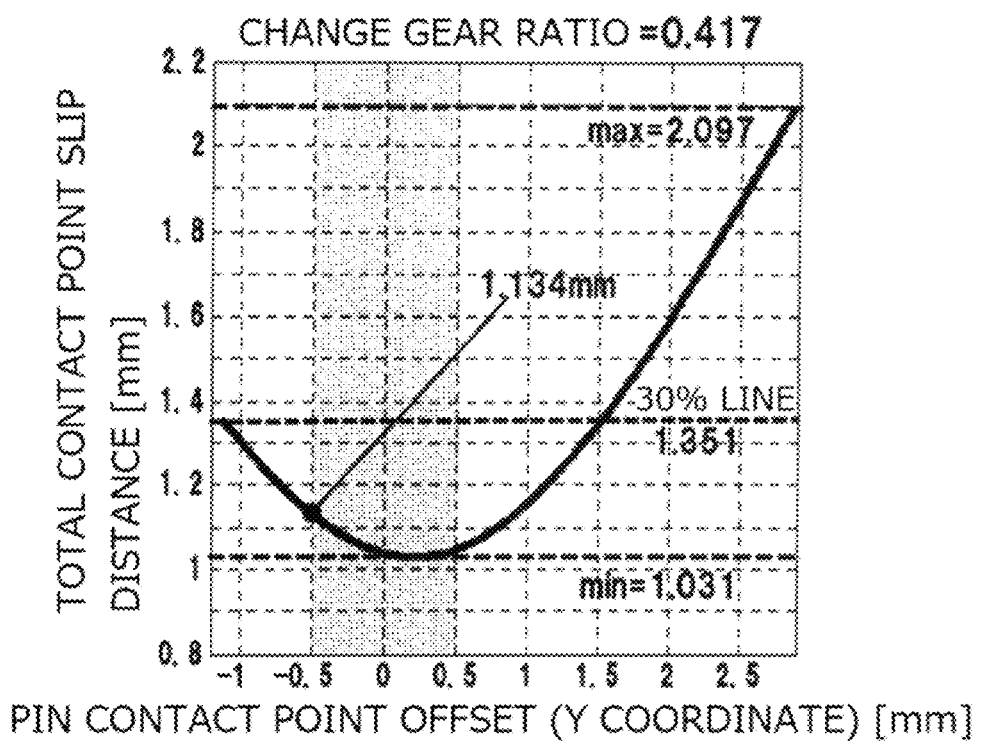
FIG. 15 is a graph showing the relation between the offset and the total contact point slip distance for the change gear ratio of 0.417 in the chain of Specification 1.
Figure 16:
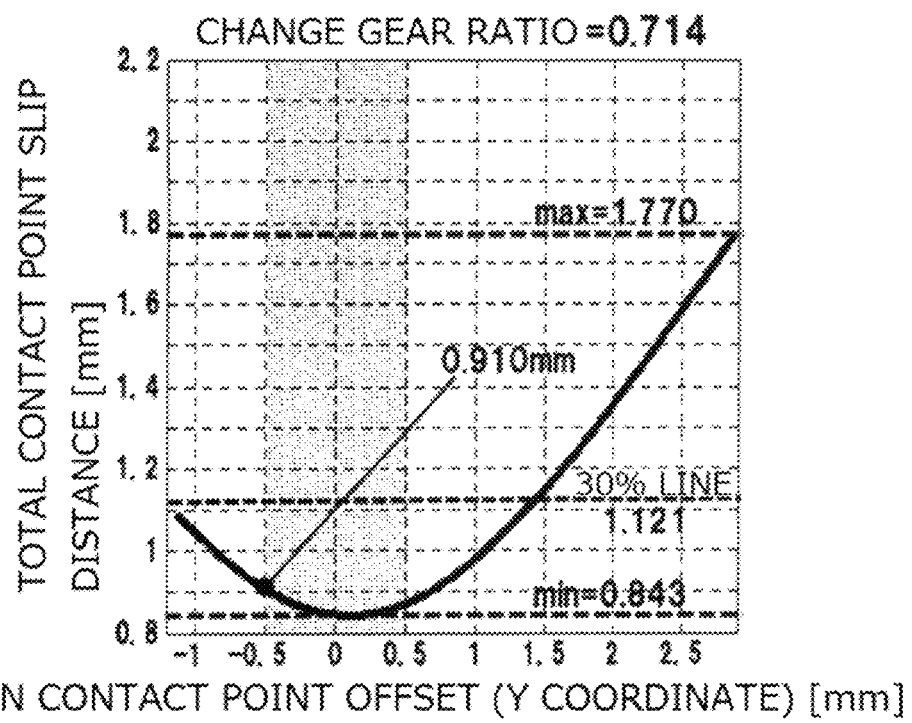
FIG. 16 is a graph showing the relation between the offset and the total contact point slip distance for the change gear ratio of 0.714 in the chain of Specification 1.
Figure 17:
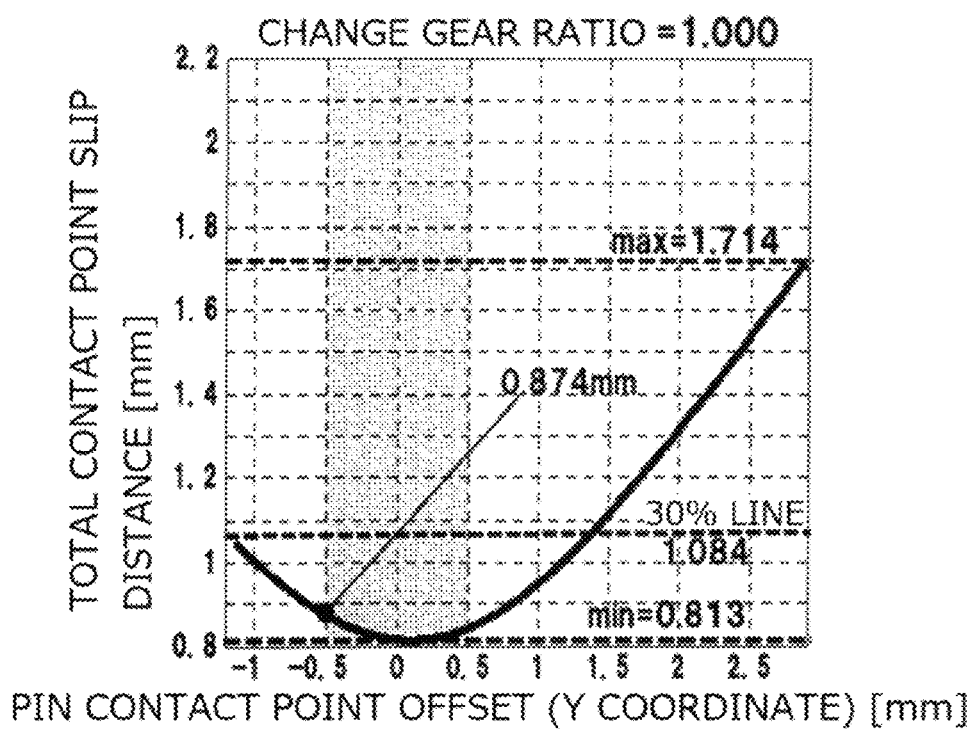
FIG. 17 is a graph showing the relation between the offset and the total contact point slip distance for the change gear ratio of 1.000 in the chain of Specification 1.
Figure 18:
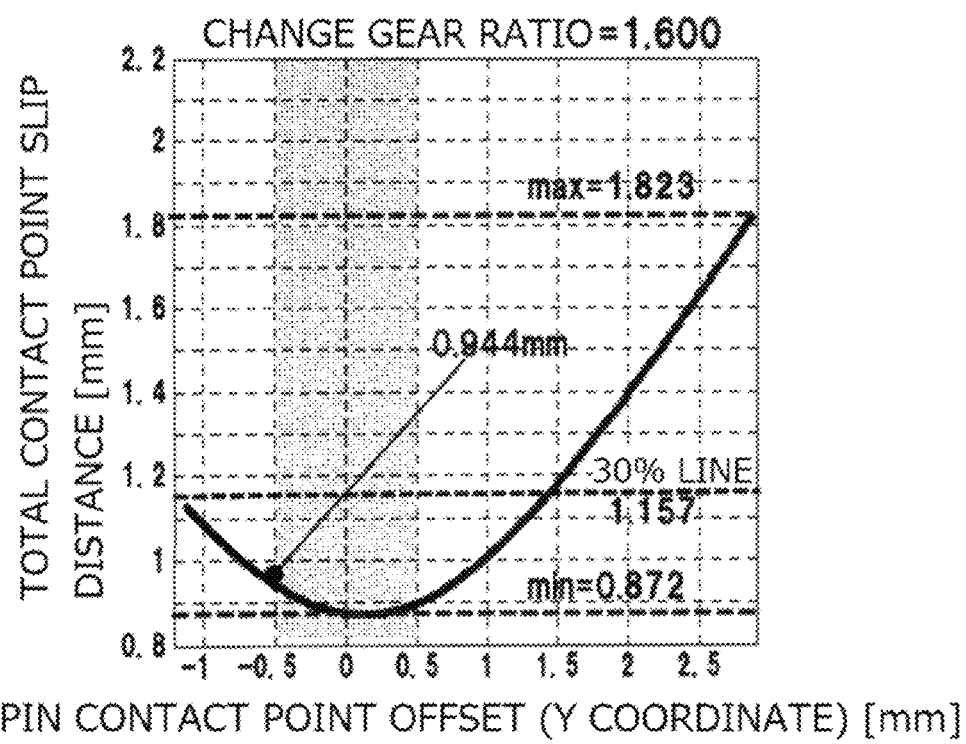
FIG. 18 is a graph showing the relation between the offset and the total contact point slip distance for the change gear ratio of 1.600 in the chain of Specification 1.
Figure 19:
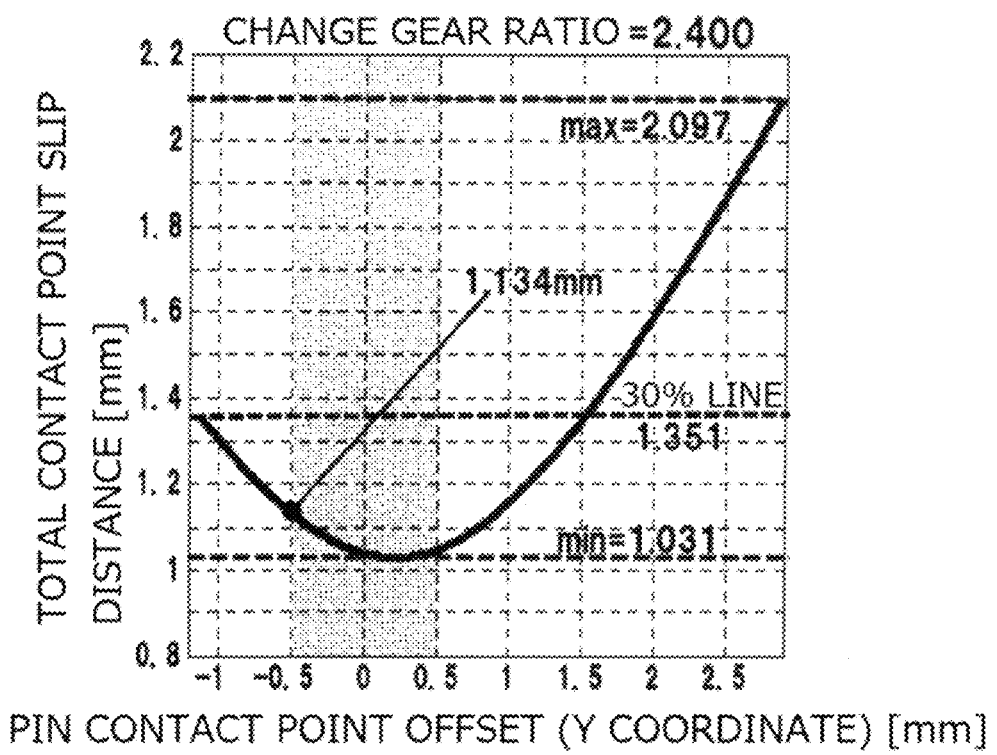
FIG. 19 is a graph showing the relation between the offset and the total contact point slip distance for the change gear ratio of 2.400 in the chain of Specification 1.

FIGS. 15 to 19 are graphs showing the relation between the offset and the total contact point slip distance T at certain change gear ratios. FIG. 15 is a graph for the change gear ratio of 0.417, FIG. 16 is a graph for the change gear ratio of 0.714, FIG. 17 is a graph for the change gear ratio of 1.000, FIG. 18 is a graph for the change gear ratio of 1.600, and FIG. 19 is a graph for the change gear ratio of 2.400. These graphs can be regarded as sectional views of FIG. 14 taken along these change gear ratios. These graphs also show that there is a range close to the origin where the total contact point slip distance T is small. In FIGS. 15 to 19, the lower 30% of the range between the minimum and maximum total contact point slip distances T at each change gear ratio is shown by a dashed line. For example, in FIG. 15, the maximum value of the total contact point slip distance T is 2.097 mm, the minimum value thereof is 1.031 mm, and the lower 30% line of the range between the minimum and maximum values is 1.351 mm. When the offset h is in the range of −0.5 mm to 0.5 mm, the total contact point slip distance T is 1.134 mm or less. Namely, the total contact point slip distance T is in the lower 30% range. In FIGS. 16 to 19 as well, when the offset h is in the range of −0.5 mm to 0.5 mm, the total contact point slip distance T is in the lower 30% range. These graphs show that setting the offset h in the range of −0.5 mm to 0.5 mm allows the chain CVT to be operated with the total contact point slip distance T being small in the entire range of the change gear ratio to be actually used. The value of 0.5 mm is 0.085 times the projected ridge length L (5.9 mm). Setting the absolute value of the offset h to a value equal to or smaller than 0.085 times the projected ridge length L thus allows the chain CVT to be operated with the total contact point slip distance T being small in the entire shift range.

$$-0.085 \times L \text{ mm} \leq h \leq 0.085 \times L \text{ mm} \tag{2}$$

In the above description, the offset h is set in view of the slip loss, namely the efficiency. However, noise needs to be also considered to set the offset h. In the chain CVT, impact that occurs when the pins engage with the pulley contributes noise. In the case where the chain 16 is accelerated when a chord region of the chain 16 enters the pulley 12, 14, impact that occurs when the chain 16 hits the pulley 12, 14 is increased. It is therefore desired that the pins not be accelerated when entering the pulley 12, 14.

Figure 20:
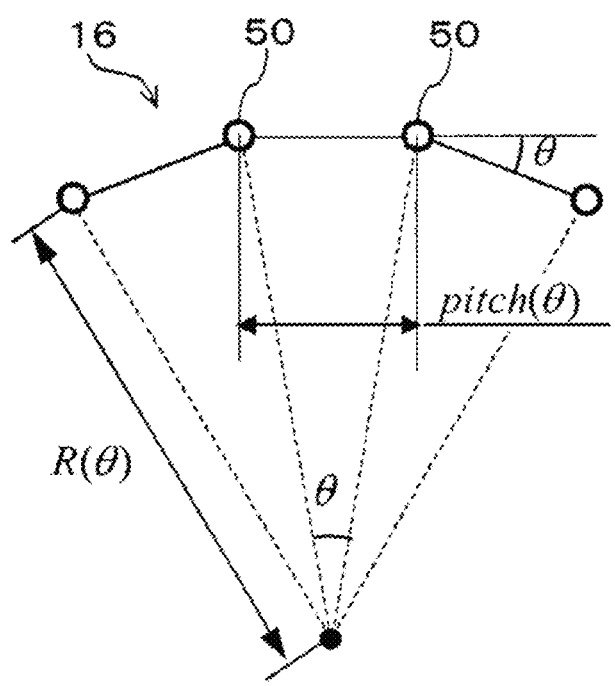
FIG. 20 is an illustration of the pitch at the time the chain is wound around a pulley.

FIG. 20 is a diagram schematically showing the state where the chain 16 is wound around the pulley 12, 14, and shows the pin-pin contact points 50. In the figure, "θ" represents an angle formed between lines drawn from the center of the pulley 12, 14 to both ends of an arc drawn between adjoining pin-pin contact points 50, namely an angle formed between lines drawn from the center of the pulley 12, 14 to adjoining pin-pin contact points 50, and "R(θ)" represents the distance between the pin-pin contact point 50 and the center of the pulley 12, 14 (running radius). The relation between the distance (pitch) pitch(θ) between adjoining pin-pin contact points 50 and the running radius R(θ) is given by the following expression (3).

$$R(\theta) = \frac{\text{pitch}(\theta)}{2\sin\left(\frac{\theta}{2}\right)} \tag{3}$$

If the pitch pitch(θ) at the time the chain 16 is wound around the pulley 12, 14 is equal to or larger than the contact point pitch P (7.14 mm) at the time the chain 16 is in the linear state, the pins 42a, 42b are not accelerated when entering the pulley 12, 14. In Specifications 1, the offset h that satisfies the above conditions even at the minimum running radius is 0.346 mm or more.

$$0.346 \text{ mm} \leq h \tag{4}$$

The range of the offset h which is obtained based on the offsets h that minimize the contact point slip distance S at the maximum running radius and the minimum running radius, namely 0.0126 mm≤h≤0.340 mm (Expression (1)), and the range of the offset h which is obtained in view of noise, namely 0.346 mm≤h (Expression (4)), do not overlap each other. Accordingly, in the case where anti-noise measures are prioritized, the offset h is set to 0.346 mm that is as close as possible to the range obtained based on the offsets h that minimize the contact point slip distance S at the maximum running radius and the minimum running radius.

$$h = 0.346 \text{ mm} \tag{5}$$

In view of both the range of the offset h which is obtained so that the chain CVT is operated in the range where the total contact point slip distance T is small, namely −0.085×L mm≤h≤0.085×L mm (Expression (2)), and the range of the offset h which is obtained in view of noise, namely 0.346 mm≤h (Expression (4)), setting the offset h between 0.346 mm and 0.085×L mm, both inclusive, can reduce slip loss and noise.

$$0.346 \text{ mm} \leq h \leq 0.085 \times L \text{ mm} \tag{6}$$

It is described above that the offset h is the same between the two pins 42a, 42b. However, the offset h may be different between the two pins 42a, 42b. That is, the offsets ha, hb of the two pins 42a, 42b may be set to different values in the range shown by Expressions (1), (2), and (6).

A chain of Specifications 2 shown in Table 2 will be described below. Specifications 2 are different from Specifications 1 in that the pin-pin contact point 50 (origin) of the chain 16 in the linear state is closer to the midpoint C of the projected ridge 54.

TABLE 2

[Specifications 2]

| | |
|---|---|
| Contact with pulley | Two pins contact pulley |
| Pin shape | Two pins have the same shape |
| Action curve | Arc with radius of 9.5 mm |
| Contact point pitch P (in linear state) | 7.14 mm |
| Inclination α of projected ridge | 8.5° |
| Projected ridge length L | 5.9 mm |
| Distance d of projected ridge from origin | 1.502 mm |
| Total number of chain elements | 90 |
| y-coordinate of pin center C | 0.164 mm |
| Shaft distance | 156 mm |

Figure 21:
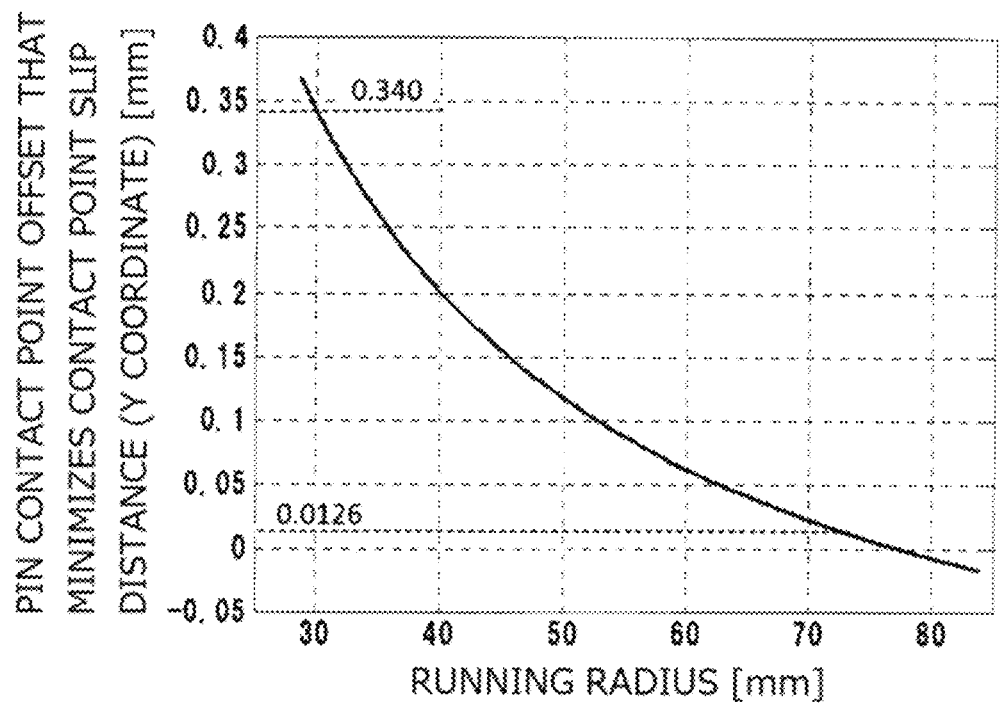
FIG. 21 is a graph showing the relation between the running radius of the chain and the offset that minimizes the contact point slip distance in the chain of Specifications 2.

FIG. 21 is a graph showing the offset h that minimizes the contact point slip distance S for each running radius of the chain 16 of Specifications 2. In Specifications 2, the pin shape is the same as in Specifications 1. The offset h that minimizes the contact point slip distance S is the same as in Specifications 1. That is, setting the offset h of the two pins between 0.0126 mm and 0.340 mm, both inclusive, can minimize the contact point slip distance S at the corresponding running radius.

$$0.0126\ \text{mm} \leq h \leq 0.340\ \text{mm} \tag{7}$$

Figure 22:
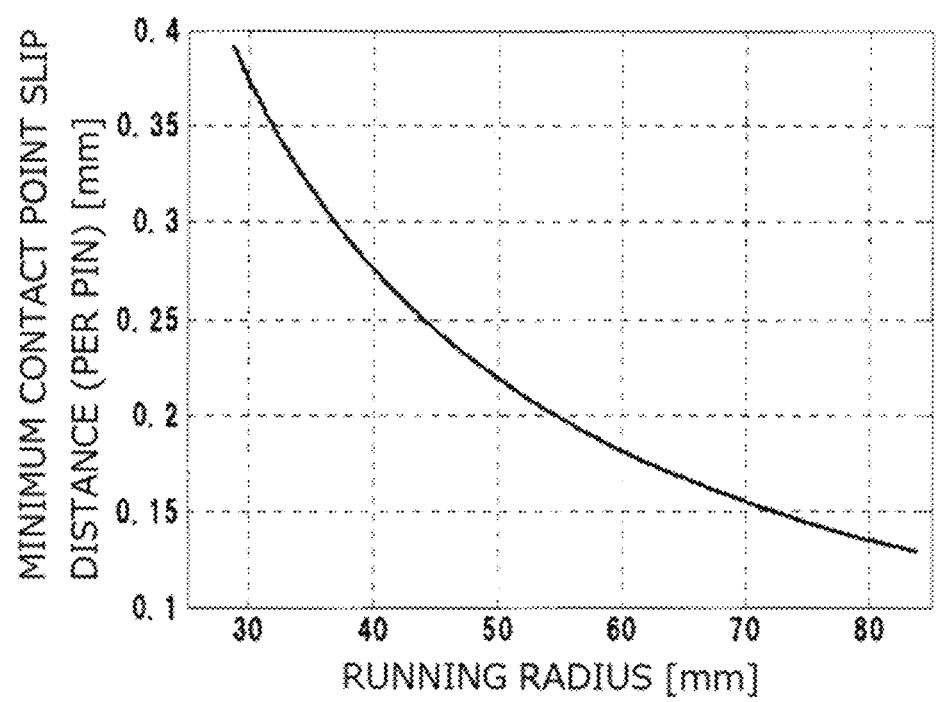
FIG. 22 is a graph showing the relation between the running radius of the chain and the minimum contact point slip distance in the chain of Specifications 2.

FIG. 22 is a graph showing the relation between the running radius and the minimum contact point slip distance S in the chain 16 of Specifications 2. The distance d of the projected ridge 54 from the origin is slightly larger in Specifications 2 than in Specifications 1. Accordingly, the minimum contact point slip distance per pin is slightly longer in FIG. 22, namely in Specifications 2, than in FIG. 13.

Figure 23:
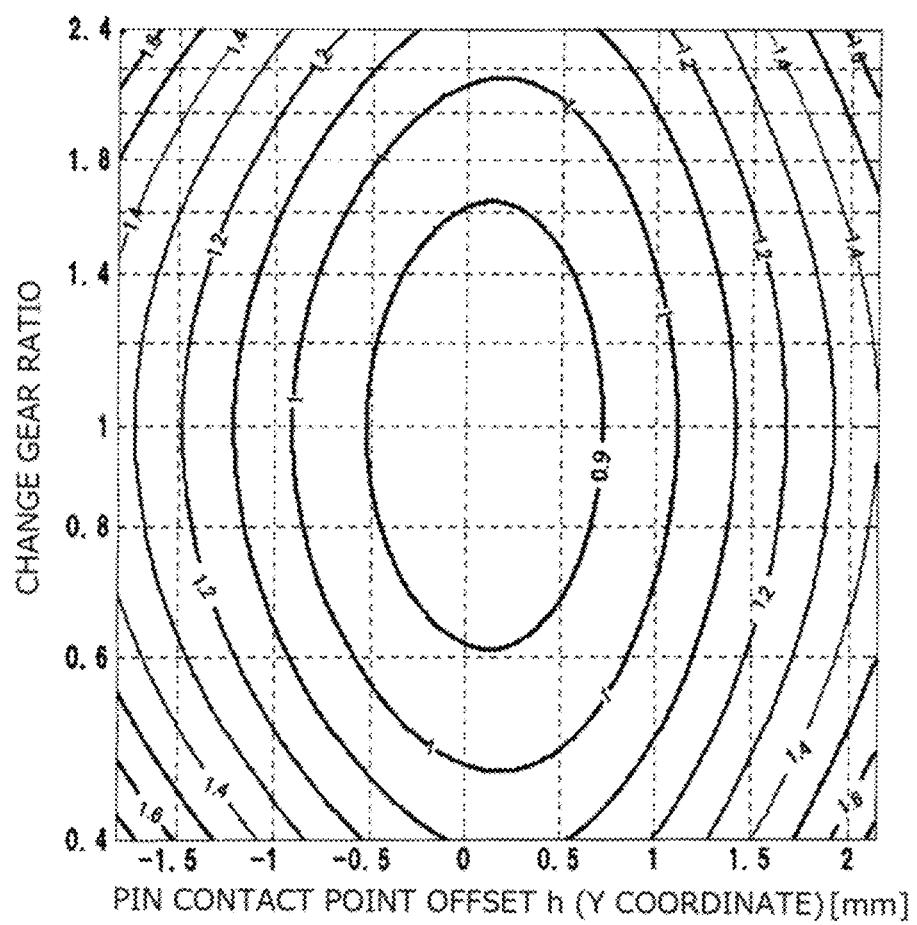
FIG. 23 is a graph showing the relation of the offset and the change gear ratio to the total contact point slip distance in the chain of Specifications 2.

FIG. 23 is a graph showing the relation of the change gear ratio and the offset h to the total contact point slip distance T in Specifications 2. The abscissa represents the offset h, and the ordinate represents the change gear ratio. Lines that look like contour lines are lines connecting the same total contact point slip distances T. As in Specifications 1 (FIG. 14), the closer the offset h is to zero, that is, the closer the pin-pulley contact point 48 is to the origin, the smaller the total contact point slip distance T is. In Specifications 2, for the change gear ratio of 1.0, the total contact point slip distance T is minimized when the offset h is 0.094 mm.

In FIGS. 14 and 23, the range of the abscissa shows the range of the projected ridge 54. Namely, the position on the abscissa represents the position on the projected ridge 54. FIGS. 14 and 23 are different from each other in the position of the origin, i.e., the pin-pin contact point 50 at the time the chain 16 is in the linear state, on the projected ridge 54. In FIG. 23, the origin is located near the midpoint of the projected ridge 54. The graph of FIG. 23 is similar to the graph of FIG. 14 shifted to the right according to the shift of the origin. This shows that a factor that reduces the contact point slip distance S is not where to position the pin-pulley contact point 48 on the projected ridge 54 but positioning the pin-pulley contact point 48 near the pin-pin contact point 50 (origin). Accordingly, setting the offset h in the same range as in the example of Specifications 1 (between ~0.085×L mm and 0.085×L mm, both inclusive) allows the chain CVT to be operated with the total contact point slip distance T being small in the entire shift range.

$$-0.085 \times L\ \text{mm} \leq h \leq 0.085 \times L\ \text{mm} \tag{8}$$

In the case where noise is considered, Expression (3) is used to obtain the condition that the pin is not accelerated when entering the pulley 12, 14. In Specifications 2, the offset h needs to be 0.340 mm or more.

$$0.340\ \text{mm} \leq h \tag{9}$$

The range of the offset h which is obtained based on the offsets h that minimize the contact point slip distance S at the maximum running radius and the minimum running radius, namely $0.0126\ \text{mm} \leq h \leq 0.340\ \text{mm}$ (Expression (7)), and the range of the offset h which is obtained in view of noise, namely $0.340\ \text{mm} \leq h$ (Expression (9)), overlap each other at 0.340 mm, and the offset h is set to this value.

$$h = 0.340\ \text{mm} \tag{10}$$

In view of both the range of the offset h which is obtained so that the chain CVT is operated in the range where the total contact point slip distance T is small, namely $-0.085 \times L$ mm $\leq h \leq 0.085 \times L$ mm (Expression (8)), and the range of the offset h which is obtained in view of noise, namely 0.340 mm h (Expression (9)), setting the offset h between 0.340 mm and 0.085×L mm, both inclusive, can reduce slip loss and noise.

$$0.340\ \text{mm} \leq h \leq 0.085 \times L\ \text{mm} \tag{11}$$

It is described above that the offset h in Specifications 1 and 2 is the same between the two pins 42a, 42b. However, the offset h may be different between the two pins 42a, 42b. That is, the offsets ha, hb of the two pins 42a, 42b may be set to different values in the range shown by Expressions (7), (8), and (11).

A chain of Specifications 3 shown in Table 3 will be described below.

TABLE 3

[Specifications 3]

| | |
|---|---|
| Contact with pulley | Only pin 42a contacts pulley |
| Pin shape | Two pins have different shapes |
| Action curve of pin 42a | Involute curve with base circle radius of 52 mm |
| Action curve of pin 42b | Straight line parallel to y-axis |
| Contact point pitch P (in linear state) | 7.14 mm |
| Inclination αa of projected ridge of pin 42a | 8.5° |
| Projected ridge length La of pin 42a | 5.9 mm |
| Distance da of projected ridge of pin 42a from origin | 1.466 mm |
| Total number of chain elements | 90 |
| y-coordinate of center Ca of pin 42a | 0.874 mm |
| Shaft distance | 156 mm |

Figure 24:
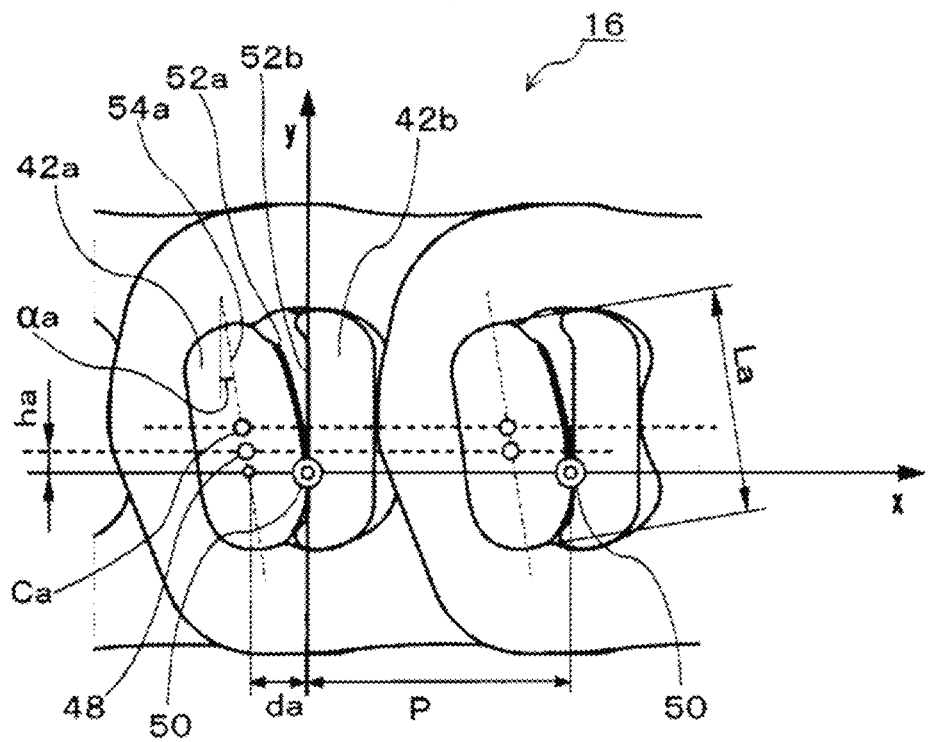
FIG. 24 is a diagram showing a coordinate system and parameters for a chain of Specifications 3.

Specifications 3 is an example in which the two pins 42a, 42b have different shapes, and only one of the pins 42a, 42b, namely only the pin 42a, contacts the pulley 12, 14. Accordingly, only slipping of the pin 42a on the pulley 12, 14 needs to be considered. FIG. 24 shows the positional relation between the pins 42a, 42b of the chain 16 in the linear state. A coordinate system is defined similarly to FIGS. 10 and 11. The pin-pin contact point 50 of the chain 16 in the linear state is the origin of the coordinate axes. The x-axis is the circumferential direction of the chain 16, the y-axis is the thickness direction of the chain 16, and the z-axis is the lateral direction of the chain 16. Parameters such as the contact point pitch, action curves, projected ridges, etc. are defined similarly to those described with respect to FIGS. 10 and 11. The action curve 52a of the pin 42a is an involute curve having its origin at the pin-pin contact point 50 and having a base circle radius of 52 mm. The action curve 52b of the pin 42b is a straight line parallel to the y-axis.

Figure 25:
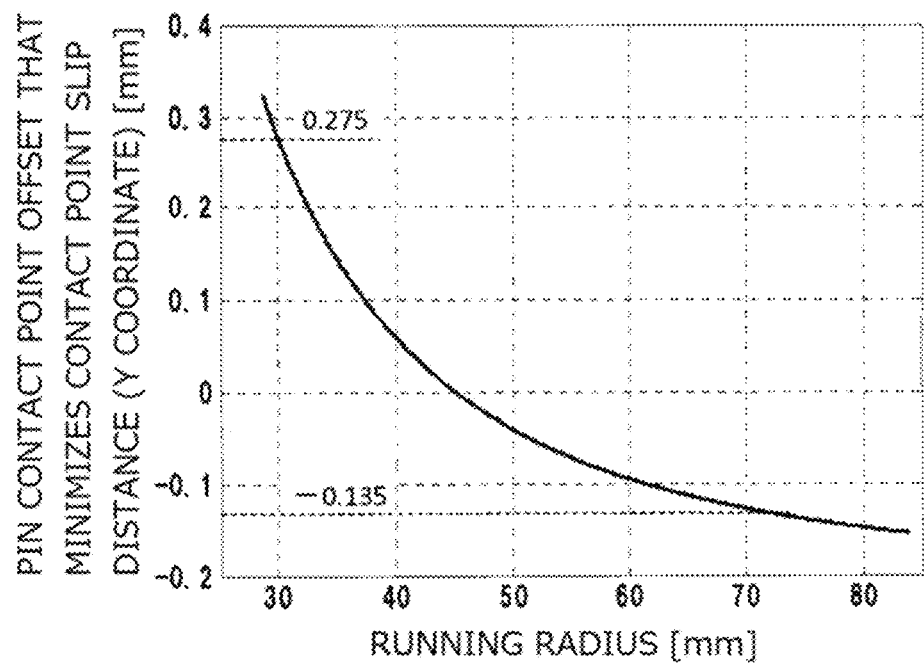
FIG. 25 is a graph showing the relation between the running radius of the chain and the offset that minimizes the contact point slip distance in the chain of Specifications 3.

FIG. 25 is a graph showing the offset h that minimizes the contact point slip distance S for each running radius of the chain 16 of Specifications 3. The offset h is set as follows in the case of using the running radius of 30 to 73 mm. The offset h that minimizes the contact point slip distance S is 0.275 mm when the running radius is 30 mm, and is −0.135 mm when the running radius is 73 mm. Setting the offset h between −0.135 mm and 0.275 mm, both inclusive, can minimize the contact point slip distance S at the corresponding running radius and can reduce slip loss.

$$-0.135 \text{ mm} \leq h \leq 0.275 \text{ mm} \tag{12}$$

Figure 26:
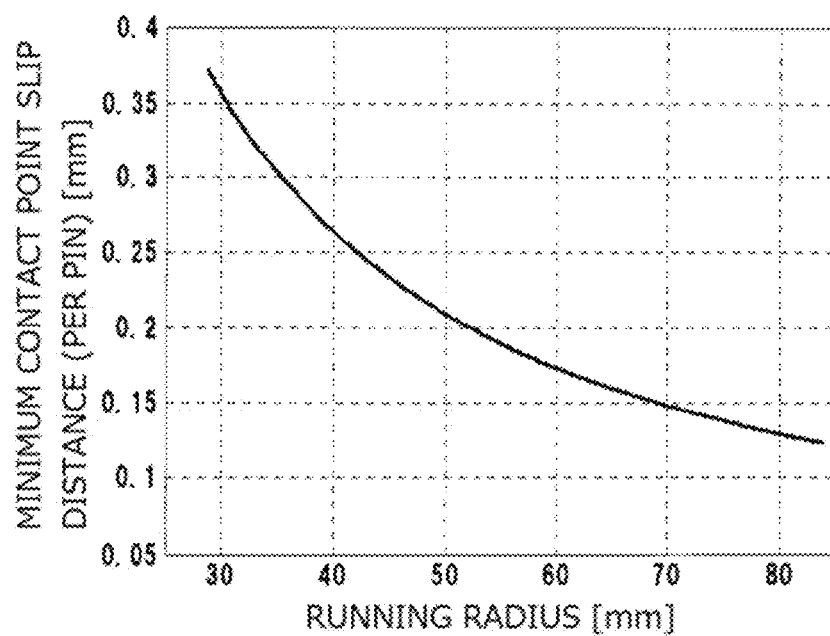
FIG. 26 is a graph showing the relation between the running radius of the chain and the minimum contact point slip distance in the chain of Specifications 3.

FIG. 26 is a graph showing the relation between the running radius and the minimum contact point slip distance S per pin. The offset h that minimizes the contact point slip distance S is obtained for each running radius, and the minimum contact point slip distance S for each running radius is shown in the graph. The graph shows that the contact point slip distance S increases as the running radius decreases, namely as the chain 16 is bent to a larger extent.

Figure 27:
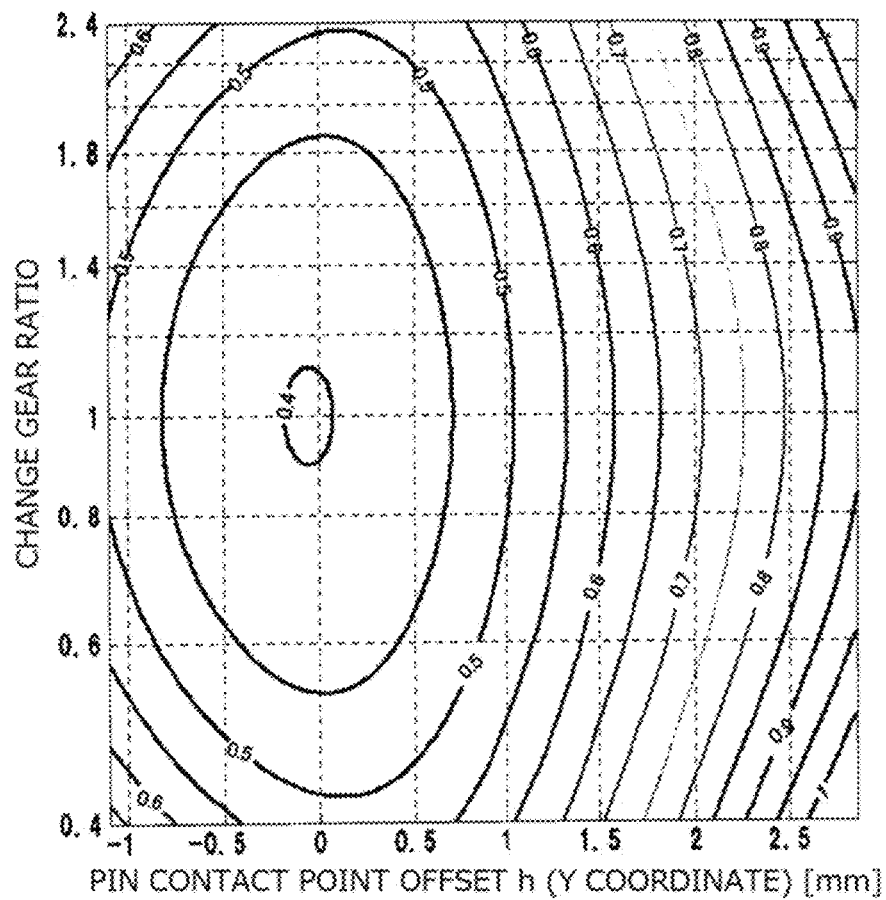
FIG. 27 is a graph showing the relation of the offset and the change gear ratio to the total contact point slip distance in the chain of Specifications 3.

FIG. 27 is a graph showing the relation of the change gear ratio and the offset h to the total contact point slip distance T. The abscissa represents the offset h, and the ordinate represents the change gear ratio. Lines that look like contour lines are lines connecting the same total contact point slip distances T. The closer the offset h is to zero, that is, the closer the pin-pulley contact point 48 is to the origin, the smaller the total contact point slip distance T is. Accordingly, setting the offset h in a certain range close to the origin can reduce the total contact point slip distance T in the shift range. For the change gear ratio of 1.0 (running radius: 51.5 mm), the total contact point slip distance T is minimized when the offset h is −0.056 mm.

In Specifications 3 as well, the offset h is set in the range where the total contact point slip distance T is small, namely in the lower 30% of the range between the minimum and maximum total contact point slip distances T, as in the case of Specifications 1 and 2. In this case as well, setting the absolute value of the offset h to 0.5 mm or less (0.085×L or less) thus allows the chain CVT to be operated in the range where the total contact point slip distance T is small.

$$-0.085 \times L \text{ mm} \leq h \leq 0.085 \times L \text{ mm} \tag{13}$$

In the case where noise is considered in Specifications 3, such an offset h that makes the pitch at the minimum running radius equal to or larger than the contact point pitch P (7.14 mm) of the chain 16 in the linear state is obtained similarly to Specifications 1 and 2. This offset h is 0.279 mm or more.

$$0.279 \text{ mm} \leq h \tag{14}$$

The range of the offset h which is obtained based on the offsets h that minimize the contact point slip distance S at the maximum running radius and the minimum running radius, namely −0.135 mm≤h≤0.275 mm (Expression (12)), and the range of the offset h which is obtained in view of noise, namely 0.279 mm≤h (Expression (14)), do not overlap each other. Accordingly, in the case where anti-noise measures are prioritized, the offset h is set to 0.279 mm that is as close as possible to the range obtained based on the offsets h that minimize the contact point slip distance S at the maximum running radius and the minimum running radius.

$$h=0.279 \text{ mm} \tag{15}$$

In view of both the range of the offset h which is obtained so that the chain CVT is operated in the range where the total contact point slip distance T is small, namely −0.085×L mm≤h≤0.085×L mm (Expression (13)), and the range of the offset h which is obtained in view of noise, namely 0.279 mm≤h (Expression (14)), setting the offset h between 0.279 mm and 0.085×L mm, both inclusive, can reduce slip loss and noise.

$$0.279 \text{ mm} \leq h \leq 0.085 \times L \text{ mm} \tag{16}$$

A chain of Specifications 4 shown in Table 4 will be described below.

TABLE 4

| [Specifications 4] | |
|---|---|
| Contact with pulley | Two pins contact pulley |
| Pin shape | Two pins have different shapes |
| Action curve of pin 42a | Involute curve with base circle radius of 52 mm |
| Action curve of pin 42b | Straight line parallel to y-axis |
| Contact point pitch P (in linear state) | 7.14 mm |
| Inclination αa of projected ridge of pin 42a | 8.5° |
| Inclination αb of projected ridge of pin 42b | 0° |
| Projected ridge length La of pin 42a | 5.9 mm |
| Projected ridge length Lb of pin 42b | 5.9 mm |
| Distance da of projected ridge of pin 42a from origin | 1.466 mm |
| Distance db of projected ridge of pin 42b from origin | 0.875 mm |
| Total number of chain elements | 90 |
| y-coordinate of center Ca of pin 42a | 0.874 mm |
| y-coordinate of center Cb of pin 42b | 0.874 mm |
| Shaft distance | 156 mm |

Figure 28:
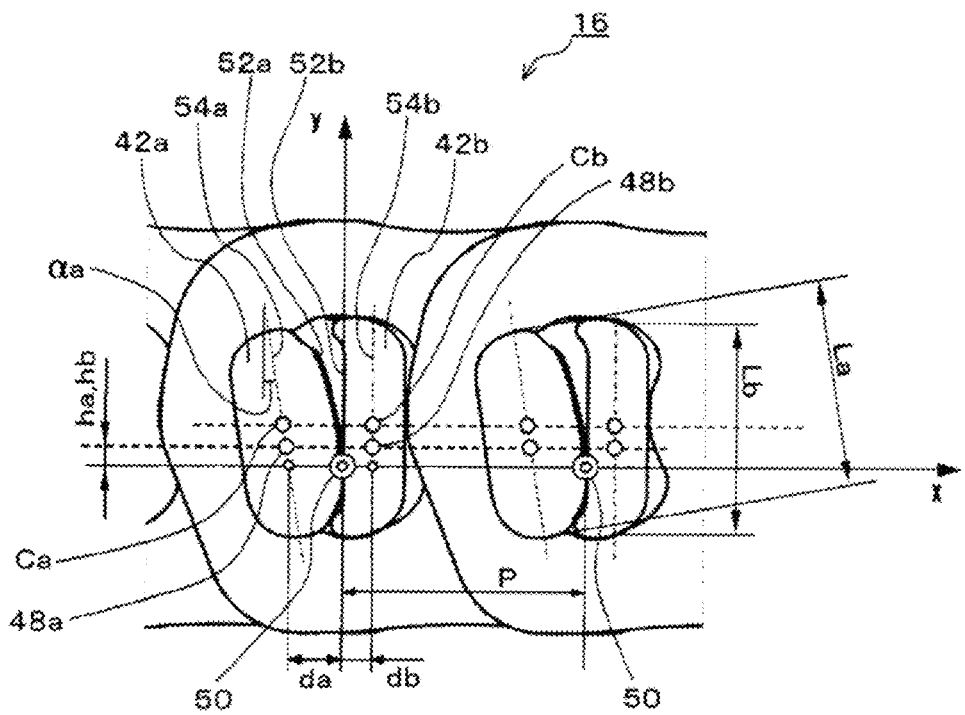
FIG. 28 is a diagram showing a coordinate system and parameters for a chain of Specifications 4.

Specifications 4 is an example in which the two pins 42a, 42b have different shapes, and both pins 42a, 42b contact the pulley 12, 14. FIG. 28 shows the positional relation between the pins 42a, 42b of the chain 16 in the linear state. A coordinate system is defined similarly to FIGS. 10 and 11. The pin-pin contact point 50 of the chain 16 in the linear state is the origin of the coordinate axes. The x-axis is the circumferential direction of the chain 16, the y-axis is the thickness direction of the chain 16, and the z-axis is the lateral direction of the chain 16. Parameters such as the contact point pitch, action curves, projected ridges, etc. are defined similarly to those described with respect to FIGS. 10 and 11. The action curve 52a of the pin 42a is an involute curve having its origin at the pin-pin contact point 50 and having a base circle radius of 52 mm. The action curve 52b of the pin 42b is a straight line parallel to the y-axis.

Figure 29:
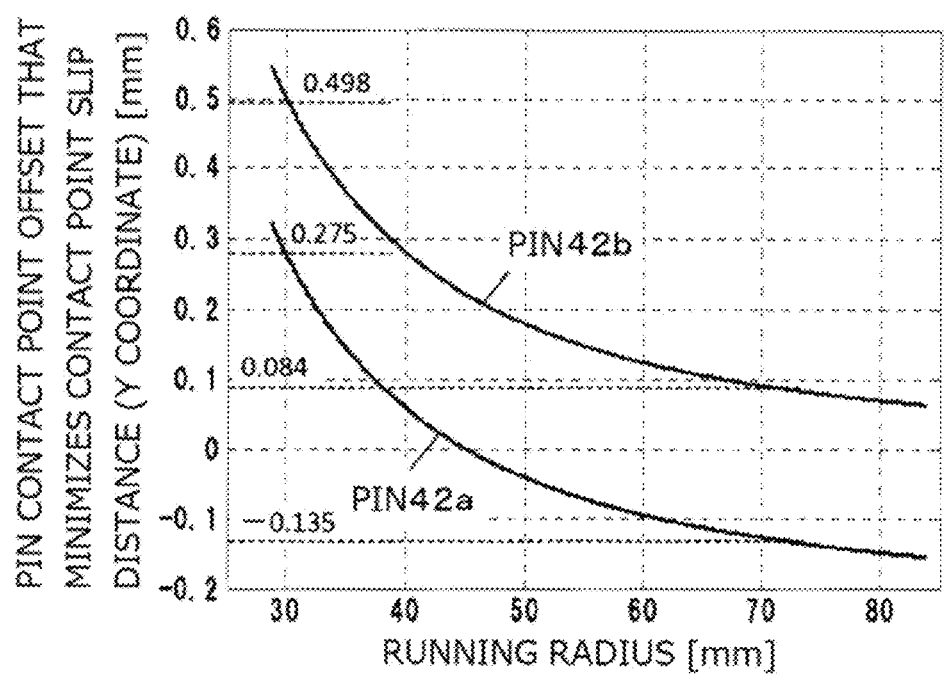
FIG. 29 is a graph showing the relation between the running radius of the chain and the offset that minimizes the contact point slip distance in the chain of Specifications 4.

FIG. 29 is a graph showing the offset h that minimizes the contact point slip distance S for each running radius of the chain 16 of Specifications 4. Since the two pins 42a, 42b have different shapes, the two pins 42a, 42b behave differently and the offsets ha, hb of the two pins 42a, 42b which minimize the contact point slip distance S are different from each other. The offsets ha, hb are set as follows in the case of using the running radius of 30 to 73 mm. The offset ha of the pin 42a which minimizes the contact point slip distance S is 0.275 mm when the running radius is 30 mm, and is −0.135 mm when the running radius is 73 mm. The offset hb of the pin 42b which minimizes the contact point slip distance S is 0.498 mm when the running radius is 30 mm, and is 0.084 mm when the running radius is 73 mm. In the case where the offsets ha, hb of the two pins 42a, 42b are set to different values, the offset ha of the pin 42a is set between −0.135 mm and 0.275 mm, both inclusive, and the offset hb of the pin 42b is set between 0.084 mm and 0.498 mm, both inclusive. Setting the offsets ha, hb in this manner can minimize the contact point slip distance S at the corresponding running radius and can reduce slip loss.

$$-0.135 \text{ mm} \leq ha \leq 0.275 \text{ mm} \quad (17a)$$

$$0.084 \text{ mm} \leq hb \leq 0.498 \text{ mm} \quad (17b)$$

In the case of setting the offsets ha, hb of the two pins 42a, 42b to the same value, the offsets ha, hb are set between the smaller one of the minimum values of the offsets ha, hb, namely −0.135 mm, and the larger one of the maximum values of the offsets ha, hb, namely 0.498 mm, both inclusive. Setting the offsets ha, hb in this range can minimize the contact point slip distance S of one of the pins 42a, 42b at the corresponding running radius and can reduce slip loss.

$$-0.135 \text{ mm} \leq ha \leq 0.498 \text{ mm} \quad (18a)$$

$$-0.135 \text{ mm} \leq hb \leq 0.498 \text{ mm} \quad (18b)$$

In another example of setting the offsets ha, hb of the two pins 42a, 42b to the same value, the offsets ha, hb may be set in the common range of Expressions (17a), (17b), namely between 0.084 mm and 0.275 mm, both inclusive.

$$0.084 \text{ mm} \leq ha \leq 0.275 \text{ mm} \quad (19a)$$

$$0.084 \text{ mm} \leq hb \leq 0.275 \text{ mm} \quad (19b)$$

Figure 30:
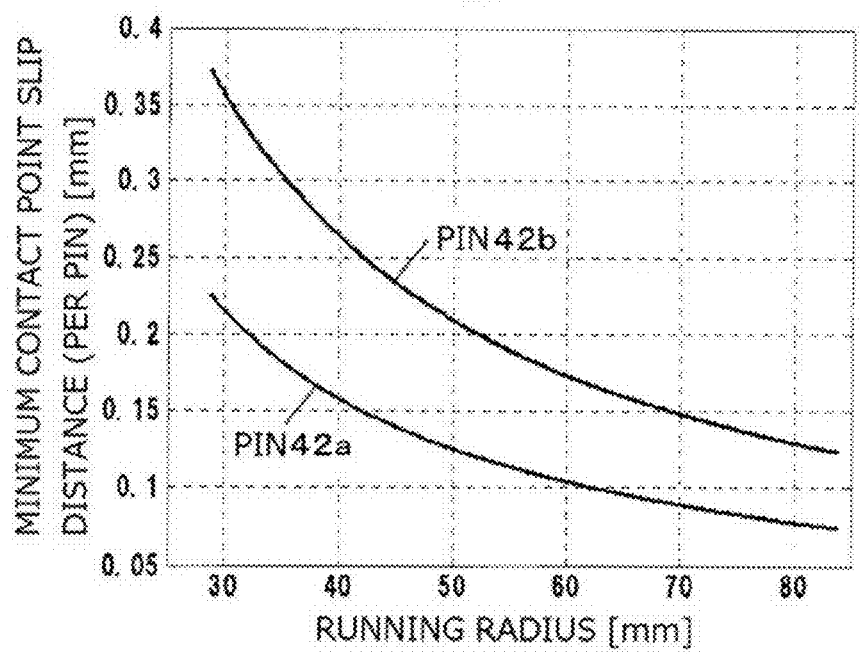
FIG. 30 is a graph showing the relation between the running radius of the chain and the minimum contact point slip distance in the chain of Specifications 4.

FIG. 30 is a graph showing the relation between the running radius and the minimum contact point slip distance S per pin. Since the two pins 42a, 42b have different shapes, the two pins 42a, 42b behave differently and the minimum contact point slip distance S is different between the two pins 42a, 42b. The offset h that minimizes the contact point slip distance S is obtained for each running radius, and the minimum contact point slip distance S for each running radius is shown in the graph. The graph shows that the contact point slip distance S increases as the running radius decreases, namely as the chain 16 is bent to a larger extent.

Figure 31:
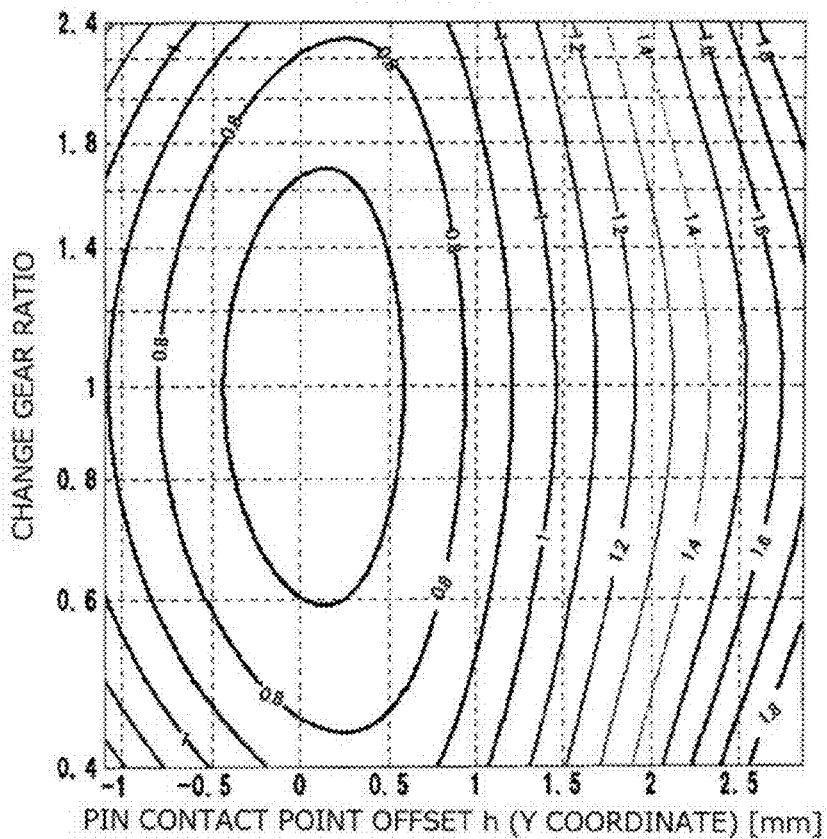
FIG. 31 is a graph showing the relation of the offset and the change gear ratio to the total contact point slip distance in the chain of Specifications 4.

FIG. 31 is a graph showing the relation of the change gear ratio and the offset h to the total contact point slip distance T. The abscissa represents the offset h, and the ordinate represents the change gear ratio. Lines that look like contour lines are lines connecting the same total contact point slip distances T. In this example, a calculation is made on the assumption that the offsets ha, hb of the two pins 42a, 42b are the same (ha, hb=h). The closer the offset h is to zero, that is, the closer the pin-pulley contact point 48 is to the origin, the smaller the total contact point slip distance T is. Accordingly, setting the offset h in a certain range close to the origin can reduce the total contact point slip distance T in the shift range. For the change gear ratio of 1.0 (running radius: 51.5 mm), the total contact point slip distance T is minimized when the offset h is 0.072 mm.

Figure 32:
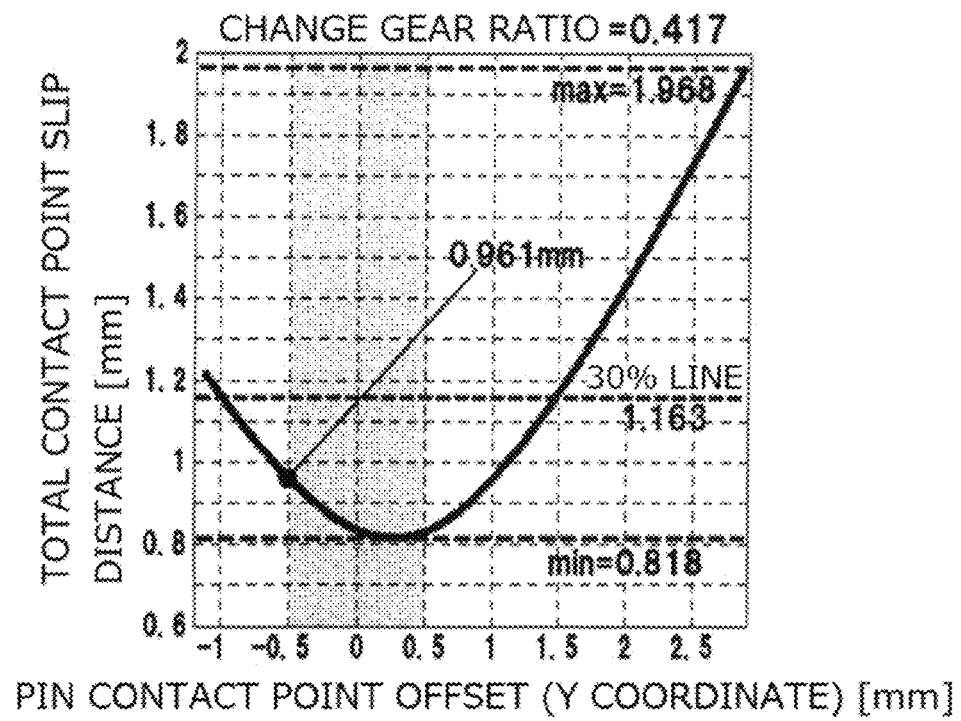
FIG. 32 is a graph showing the relation between the offset and the total contact point slip distance for the change gear ratio of 0.417 in the chain of Specifications 4.
Figure 33:
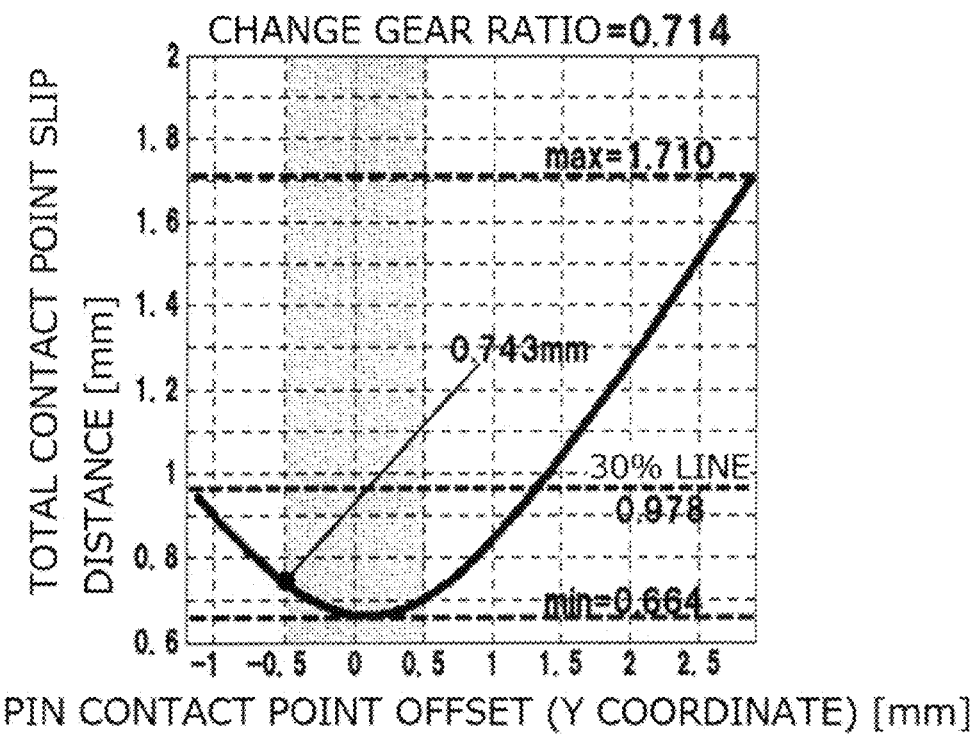
FIG. 33 is a graph showing the relation between the offset and the total contact point slip distance for the change gear ratio of 0.714 in the chain of Specifications 4.
Figure 34:
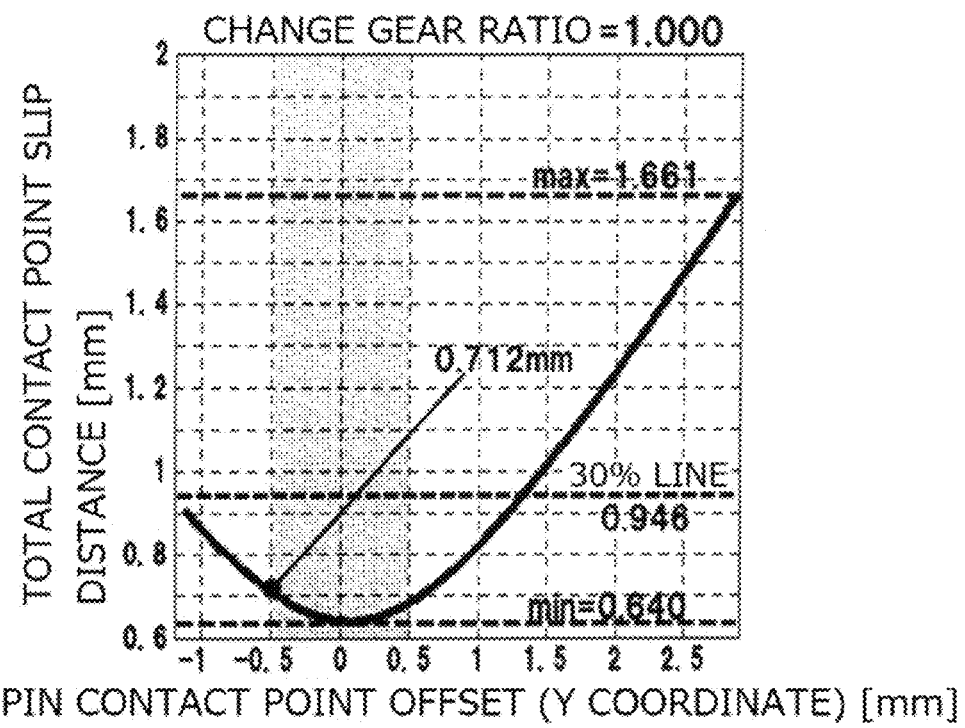
FIG. 34 is a graph showing the relation between the offset and the total contact point slip distance for the change gear ratio of 1.000 in the chain of Specifications 4.
Figure 35:
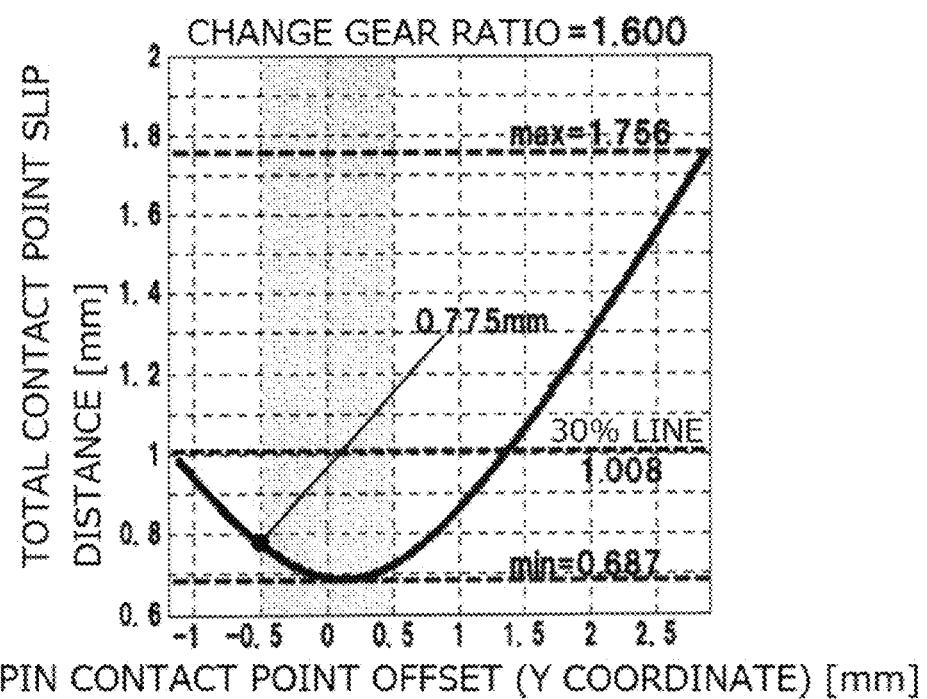
FIG. 35 is a graph showing the relation between the offset and the total contact point slip distance for the change gear ratio of 1.600 in the chain of Specifications 4.

FIGS. 32 to 36 are graphs showing the relation between the offset and the total contact point slip distance T at certain change gear ratios, as in FIGS. 15 to 19. FIG. 32 is a graph for the change gear ratio of 0.417, FIG. 33 is a graph for the change gear ratio of 0.714, FIG. 34 is a graph for the change gear ratio of 1.000, FIG. 35 is a graph for the change gear ratio of 1.600, and FIG. 36 is a graph for the change gear ratio of 2.400. These graphs can be regarded as sectional views of FIG. 31 taken along these change gear ratios. These graphs also show that there is a range close to the origin where the total contact point slip distance T is small. In FIGS. 32 to 36, the lower 30% of the range between the minimum and maximum total contact point slip distances T at each change gear ratio is shown by a dashed line. For example, in FIG. 32, the maximum value of the total contact point slip distance T is 1.968 mm, the minimum value thereof is 0.818 mm, and the lower 30% line of the range between the minimum and maximum values is 1.163 mm. When the offset h is in the range of −0.5 mm to 0.5 mm, the total contact point slip distance T is at most 0.961 mm. The total contact point slip distance T is thus in the lower 30% range. In FIGS. 33 to 36 as well, when the offset h is in the range of −0.5 mm to 0.5 mm, the total contact point slip distance T is in the lower 30% range. These graphs show that setting the offset h in the range of −0.5 mm to 0.5 mm allows the chain CVT to be operated with the total contact point slip distance T being small in the entire range of the change gear ratio to be actually used. The value of 0.5 mm is 0.085 times the projected ridge length L (5.9 mm). Setting the absolute value of the offset h to a value equal to or smaller than 0.085 times the projected ridge length L thus allows the chain CVT to be operated with the total contact point slip distance T being small in the entire shift range.

In Specifications 4 as well, the offset h is set in the range where the total contact point slip distance T is small, namely in the lower 30% of the range between the minimum and maximum total contact point slip distances T, as in the case of Specifications 1, 2, and 3. In this case as well, setting the absolute value of the offset h to 0.5 mm or less (0.085×L or less) thus allows the chain CVT to be operated in the range where the total contact point slip distance T is small.

$$-0.085 \times L \text{ mm} \leq ha \leq 0.085 \times L \text{ mm} \quad (20a)$$

$$-0.085 \times L \text{ mm} \leq hb \leq 0.085 \times L \text{ mm} \quad (20b)$$

In the case where noise is considered in Specifications 4, such offsets ha, hb of the pins 42a, 42b that make the pitch at the minimum running radius equal to or larger than the contact point pitch P (7.14 mm) of the chain 16 in the linear state is 0.279 mm or more and 0.372 mm or more, respectively, as in the case of Specifications 1, 2, and 3.

$$0.279 \text{ mm} \leq ha \quad (21a)$$

$$0.372 \text{ mm} \leq hb \quad (21b)$$

Setting of the offset h in view of the range of the offset h which is obtained based on the offsets h that minimize the contact point slip distance S at the maximum running radius and the minimum running radius and the range of the offset h which is obtained in view of noise will be described. The offsets ha, hb of the two pins 42a, 42b are set as follows in the case of setting the offsets ha, hb to different values. Regarding the offset ha of the pin 42a, the range of the offset ha which is obtained based on the offsets ha that minimize the contact point slip distance S at the maximum running radius and the minimum running radius, namely −0.135 mm≤ha≤0.275 mm (Expression (17a)), and the range of the offset ha which is obtained in view of noise, namely 0.279 mm≤ha (Expression (21a)), do not overlap each other. Accordingly, in the case where anti-noise measures are prioritized, the offset ha is set to 0.279 mm that is as close as possible to the range obtained based on the offsets ha that minimize the contact point slip distance S at the maximum running radius and the minimum running radius. Regarding the offset hb of the pin 42b, the range of the offset hb which is obtained based on the offsets hb that minimize the contact point slip distance S at the maximum running radius and the minimum running radius, namely 0.084 mm≤hb≤0.498 mm (Expression (17b)), and the range of the offset hb which is obtained in view of noise, namely 0.372 mm≤hb (Expression (21b)), overlap each other in the range of 0.372 mm to 0.498 mm, both inclusive, and the offset hb is thus set in this range.

$$ha=0.279 \text{ mm} \tag{22a}$$

$$0.372 \text{ mm} \leq hb \leq 0.498 \text{ mm} \tag{22b}$$

In the case of setting the offsets ha, hb of the two pins $42a$, $42b$ to the same value, the offsets ha, hb are set between 0.372 mm and 0.498 mm, both inclusive, based on Expressions (18a), (18b), and (21b).

$$0.372 \text{ mm} \leq ha \leq 0.498 \text{ mm} \tag{23a}$$

$$0.372 \text{ mm} \leq hb \leq 0.498 \text{ mm} \tag{23b}$$

In the case of setting the offsets ha, hb to the same value based on the combination of Expressions (19a), (19b), and (21b), Expressions (19a), (19b) and Expression (21b) do not overlap each other, and therefore the offsets ha, hb are set to 0.372 mm that is as close as possible to the range of Expressions (19a), (19b).

$$ha, hb = 0.372 \text{ mm} \tag{24}$$

In view of both the range of the offsets ha, hb which is obtained so that the chain CVT is operated in the range where the total contact point slip distance T is small, namely $-0.085 \times L$ mm≤ha, hb≤$0.085 \times L$ mm (Expressions (20a), (20b)), and the ranges of the offsets ha, hb which are obtained in view of noise, namely 0.279 mm ha (Expression (21a)) and 0.372≤hb (Expression (21b)), setting the offsets ha, hb in the common range of these ranges, namely between 0.372 mm and $0.085 \times L$ mm, both inclusive, can reduce slip loss and noise.

$$0.372 \text{ mm} \leq ha \leq 0.085 \times L \text{ mm} \tag{25a}$$

$$0.372 \text{ mm} \leq hb \leq 0.085 \times L \text{ mm} \tag{25b}$$

According to the present invention, the contact point slip distance can be reduced, and friction loss can therefore be reduced.

What is claimed is:

1. A continuously variable transmission, comprising:
two pulleys, each of the pulleys having opposing conical surfaces and being configured so that a distance between the conical surfaces can be changed; and
a chain that is wound around the two pulleys and is held between the conical surfaces, wherein
the chain includes plate-like links, each of the plate-like links having an opening and being arranged in a circumferential direction of the chain and formed by coupling chain elements to each other,
each of the chain elements includes a link unit that is formed by a plurality of the links arranged in a lateral direction of the chain, and two pins that extend through both ends of each of the openings of the links and that contact the conical surfaces at both ends of the conical surfaces,
the chain elements are coupled to each other by inserting a pin of each chain element through the openings of the links of another chain element adjoining in the circumferential direction of the chain,
offsets of the two pins are set between: (i) a larger one of the offsets of the two pins that minimize a contact point slip distance between a linear state and a maximum bent state of the chain; and (ii) a smaller one of the offsets of the two pins that minimize the contact point slip distance between the linear state and a minimum bent state of the chain, the contact point slip distance being a distance by which a pin-pulley contact point, which is a contact point of the pin with the pulley, moves in a thickness direction of the chain at the time the pin-pulley contact point slips and moves on the conical surface of the pulley, and
an offset is a directed distance of the pin-pulley contact point from a reference point in a thickness direction of the chain, the reference point being a pin-pin contact point, which is a contact point between the pins of each chain element, at the time the adjoining chain elements are in the linear state.

2. A continuously variable transmission, comprising:
two pulleys, each of the pulleys having opposing conical surfaces and being configured so that a distance between the conical surfaces can be changed; and
a chain that is wound around the two pulleys and is held between the conical surfaces, wherein
the chain includes plate-like links, each of the plate-like links having an opening and being arranged in a circumferential direction of the chain and formed by coupling chain elements to each other,
each of the chain elements includes a link unit that is formed by a plurality of the links arranged in a lateral direction of the chain, and two pins that extend through both ends of each of the openings of the links and that contact the conical surfaces at both ends,
the chain elements are coupled to each other by inserting a pin of each chain element through the openings of the links of another chain element adjoining in the circumferential direction of the chain,
an offset of a first pin of the two pins is set between: (i) an offset that minimizes a contact point slip distance of the first pin between a linear state and a maximum bent state of the chain; and (ii) an offset that minimizes the contact point slip distance of the first pin between the linear state and a minimum bent state of the chain, the contact point slip distance being a distance by which a pin-pulley contact point, which is a contact point of the pin with the pulley, moves in a thickness direction of the chain at the time the pin-pulley contact point slips and moves on the conical surface of the pulley,
an offset of a second pin of the two pins is set between: (i) an offset that minimizes a contact point slip distance of the second pin between the linear state and the maximum bent state of the chain; and (ii) an offset that minimizes the contact point slip distance of the second pin between the linear state and the minimum bent state of the chain, and
the offset is a directed distance of the pin-pulley contact point, which is a contact point of the pin with the pulley, from a reference point in a thickness direction of the chain, the reference point being a pin-pin contact point, which is a contact point between the pins of each chain element, at the time the adjoining chain elements are in the linear state.

3. A continuously variable transmission, comprising:
two pulleys, each of the pulleys having opposing conical surfaces and being configured so that a distance between the conical surfaces can be changed; and
a chain that is wound around the two pulleys and is held between the conical surfaces, wherein
the chain includes plate-like links, each of the plate-like links having an opening and being arranged in a circumferential direction of the chain and is formed by coupling chain elements to each other, each of the chain elements includes a link unit that is formed by a plurality of the links arranged in a lateral direction of the chain, and two pins that extend through both ends of each of the openings of the links and that contact the conical surfaces at both ends, and the chain elements are coupled to each other by inserting a pin of each chain element through the openings of the links of another chain element adjoining in the circumferential direction of the chain, absolute values of offsets of the two pins are less than or equal to 0.085 times a length of a projected ridge of the pin, and an offset is a directed distance of a pin-pulley contact point, which is a contact point of the pin with the pulley, from a reference point in a thickness direction of the chain, the reference point being a pin-pin contact point, which is a contact point between the pins of each chain element, at the time the adjoining chain elements are in a linear state, and the projected ridge is a line formed by projecting on a plane perpendicular to the lateral direction of the chain a line connecting outermost points of an end face of the pin which faces the pulley, which are points of the end face of the pin which are located closest to the pulley, in each section of the pin perpendicular to the thickness direction of the chain.

4. The continuously variable transmission according to claim 1, wherein the offset of each pin is set to a value such that a contact point pitch at the time the chain is in the maximum bent state is greater than or equal to a contact point pitch at the time the chain is in the linear state, and the contact point pitch is a distance between adjoining ones of the pin-pin contact points.

5. The continuously variable transmission according to claim 2, wherein the offset of each pin is set to a value such that a contact point pitch at the time the chain is in the maximum bent state is greater than or equal to a contact point pitch at the time the chain is in the linear state, and the contact point pitch is a distance between adjoining ones of the pin-pin contact points.

6. The continuously variable transmission according to claim 3, wherein the offset of each pin is set to a value such that a contact point pitch at the time the chain is in the maximum bent state is greater than or equal to a contact point pitch at the time the chain is in the linear state, and the contact point pitch is a distance between adjoining ones of the pin-pin contact points.

* * * * *